United States Patent [19]

Brewer et al.

[11] Patent Number: 4,860,185
[45] Date of Patent: Aug. 22, 1989

[54] INTEGRATED UNINTERRUPTIBLE POWER SUPPLY FOR PERSONAL COMPUTERS

[75] Inventors: David C. Brewer; Conrad P. Lindberg; Paul M. Lindberg, all of San Diego, Calif.

[73] Assignee: Electronic Research Group, Inc., San Diego, Calif.

[21] Appl. No.: 87,894

[22] Filed: Aug. 21, 1987

[51] Int. Cl.$^4$ .................................................. H02J 7/00
[52] U.S. Cl. ........................................ 363/41; 307/66
[58] Field of Search .............. 363/35, 37, 41; 307/22, 307/66, 83

[56] References Cited

U.S. PATENT DOCUMENTS

| 4,266,268 | 5/1981 | Tkacenko | 363/49 |
|---|---|---|---|
| 4,347,558 | 8/1982 | Kalinsky | 363/17 |
| 4,377,779 | 3/1983 | Plunkett | 318/811 |
| 4,401,895 | 8/1983 | Petkovsek | 307/66 |
| 4,426,587 | 1/1984 | Nouet | 307/66 |
| 4,449,175 | 5/1984 | Ishii et al. | 363/26 |
| 4,466,052 | 8/1984 | Thrap | 363/41 |
| 4,468,571 | 8/1984 | Heavey et al. | 307/66 |
| 4,494,178 | 1/1985 | Ishima | 363/21 |
| 4,556,802 | 12/1985 | Harada et al. | 307/66 |
| 4,564,767 | 1/1986 | Charych | 307/66 |
| 4,566,060 | 1/1986 | Hoeksma | 363/21 |
| 4,581,690 | 4/1986 | Russell | 363/17 |
| 4,586,119 | 4/1986 | Sutton | 363/17 |
| 4,595,872 | 6/1986 | Ball | 320/13 |
| 4,634,888 | 1/1987 | Deavenport | 307/48 |
| 4,651,112 | 3/1987 | Keysor | 307/66 X |
| 4,656,572 | 4/1987 | Caputo et al. | 363/41 |
| 4,672,228 | 6/1987 | Swobada | 307/66 |
| 4,672,521 | 6/1987 | Riesco | 363/41 |
| 4,673,825 | 6/1987 | Raddi et al. | 307/66 |
| 4,686,480 | 8/1987 | Katto et al. | 363/41 X |
| 4,686,616 | 8/1987 | Williamson | 363/21 |

FOREIGN PATENT DOCUMENTS

| 30190904 | 8/1986 | European Pat. Off. . | |
|---|---|---|---|
| 3007629 | 9/1981 | Fed. Rep. of Germany . | |
| 3419792 | 11/1985 | Fed. Rep. of Germany . | |
| 55106996 | 2/1982 | Japan | 363/41 |
| 56-64789 | 11/1982 | Japan | 363/17 |
| 56203204 | 6/1983 | Japan | 363/41 |
| 56210621 | 7/1983 | Japan | 363/41 |
| 56211583 | 7/1983 | Japan | 363/41 |
| WO85/02301 | 5/1985 | PCT Int'l Appl. . | |
| WO85/02301 | 5/1985 | PCT Int'l Appl. | 307/66 |
| 0655044 | 3/1979 | U.S.S.R. | 363/17 |

OTHER PUBLICATIONS

"200 KHz Power FET Technology in OEM Modular Power Supplies", by Bailey et al, *Electronic Engineering*, Sep. 1981.

Application Bulletin No. A035: "Switchmode Converter Topologies–Make Them Work For You?", by R. Severus; published by Intersil, Inc., dated Jun. 1980.

*Primary Examiner*—William M. Shoop, Jr.
*Assistant Examiner*—Marc S. Hoff
*Attorney, Agent, or Firm*—Merchant, Gould, Smith, Edell, Welter & Schmidt

[57] ABSTRACT

A method and apparatus for providing uninterrupted DC and AC power for a desktop personal computer is described. The source of the uninterrrupted DC and AC power is derived from an integrated power supply that is sized to fit within the existing housings of most desktop personal computers as a plug-in replacement for existing power supplies. A high degree of efficiency is obtained using an integrated design with the main power conversion derived from a DC/DC dual primary resonant converter. The main primary of the resonant converter is driven from a high voltage DC bus which is supplied from AC mains when available. When the AC mains is unavailable, the second primary of the DC/DC dual primary resonant converter receives power from a low voltage battery source. Secondaries of the converter produce low voltage DC for driving the personal computer, high voltage DC for augmenting the high voltage DC bus, which in turn is used to drive a DC/AC inverter for supplying uninterrupted AC voltage for powering peripherals such as a monitor, printer, etc. A medium-voltage secondary is also sourced from the converter which drives a battery charger to recharge an internal battery pafck upon restoration of the AC mains.

21 Claims, 22 Drawing Sheets

INTEGRATED UNINTERRUPTIBLE POWER SUPPLY FOR PERSONAL COMPUTERS

FIELD OF THE INVENTION

The present invention relates to electrical power supplies. In particular, the present invention relates to a method and apparatus for providing uninterrupted AC and DC electric power for personal computers.

BACKGROUND OF THE INVENTION

Personal computers have internal power supplies which convert the AC line voltage (120VAC, 60 Hz, as commonly found in the United States) to the appropriate DC voltage levels required for the operation of the microprocessor and associated components of the computer. Some of the peripheral components of a personal computing system, such as the monitor, printer or plotter run off the AC mains either directly or from a feed-through path from a plug located on the back of the personal computer. Although there are a wide variety of personal computers in use, the vast majority of them use the aforementioned concept for powering a personal computer system.

AC power loss in the aforementioned computing environment results in a near-instantaneous loss of data and programs running on the personal computer system at the time. Moreover, loss of AC power can sometimes result in damage to some of the components such as disk drives, etc. Even momentary loss of AC power for less than one cycle of the line current can result in loss of data or incorrect results due to the power line "glitch". Also, AC power loss means the loss of AC-powered peripheral components such as monitors, printers, etc. Many prior art power supplies for personal computers simply provide a feed-through from the AC mains to a plug on the back to provide AC power to run the auxiliary or peripheral devices.

Uninterruptible power supplies are known in the prior art for providing power to computers, however they are neither efficient nor integrated in their design to obtain a compactness of design which allow them to be internally installed inside existing personal computer cabinets. Prior art uninterruptible supplies require large battery packs to source power for a short period of time due to their inefficient design and power conversion techniques. Therefore, a great need exists in the personal computing industry for a power supply that is immune to temporary interruptions of AC mains, is highly efficient for operating from batteries, provides uninterrupted AC power for peripherals, and is compact enough to fit within the housings of existing personal computers.

SUMMARY OF THE INVENTION

The present invention describes in the preferred embodiment an integrated uninterruptible power supply for personal computers which provides both DC and AC mains voltages for running the personal computer and its associated peripheral components during loss of AC mains power. Due to the topology of the present invention, AC line conditioning is another feature of the present invention. Overvoltage, undervoltage, spikes, noise, and cycle dropouts are commonly known types of AC power problems which can result in failure of the personal computing system. The aforementioned types of problems are descriptive and not limiting, and all are prevented from causing errors in the computing system by the present invention.

Accordingly, the present invention describes an uninterruptible power supply which can be installed in the housings of existing personal computers and is integrated in its design topology. In the preferred embodiment, AC mains line voltage is converted to a high voltage DC bus to drive a DC-to-AC inverter to produce AC line voltage out for use in driving AC-powered peripheral components of the personal computer system. The high voltage DC bus is also used to drive the first primary of a dual primary resonant converter circuit. This resonant converter circuit receives input power from either a high-voltage primary or a medium voltage primary and produces on its secondaries low voltage DC for driving a personal computer, medium voltage DC for driving a battery charger, and high voltage DC for driving the high-voltage DC bus upon failure of the AC mains. The medium voltage primary of the DC-to-DC dual primary resonant converter is driven from an internal battery pack. Due to the integrated design of the present invention and the high conversion efficiency resulting therefrom, the battery pack has the ability to power the AC output and low voltage DC outputs of the present invention for an extended period during AC mains failure. The medium voltage primary of the DC-to-DC dual primary resonant converter is invoked by a control circuit upon sensing of the failure of AC mains. Upon restoration of the AC mains, the high voltage primary of the DC-to-DC dual primary resonant converter is reactivated and the medium voltage secondary of the DC-to-DC dual primary resonant converter is used to drive a battery charger which in turn recharges the battery pack, which is now in idle state.

A novel DC-to-AC converter circuit is also disclosed which provides a very accurate AC 60-cycle sine-wave output from a DC input voltage. This circuit uses a monolithic pulse width modulator circuit in a unique fashion by comparing the resultant output voltage against a digitally stored representation of a 60-cycle sine wave stored in ROM. The comparison of the stored sine wave representation against the sensed output voltage produces an error voltage which is used to control the pulsewidth modulator, which in turn is used to control the switching transistors in a DC-to-AC converter system.

BRIEF DESCRIPTION OF THE DRAWINGS

In the drawings, where like numerals refer to like components throughout the several views.

DETAILED DESCRIPTION OF THE PREFERRED EMBODIMENT

In the following detailed description of the preferred embodiment, reference is made to the accompanying drawings which form a part hereof, and in which is shown by way of illustration, a specific embodiment in which the invention may be practiced. This embodiment is described in sufficient detail to enable those skilled in the art to practice the invention, and it is to be understood that other embodiments may be utilized and that structural or electronic changes may be made without departing from the scope of the present invention. The following detailed description is, therefore, not to be taken in a limiting sense, and the scope of the present invention is defined by the appended claims.

Figure 1:
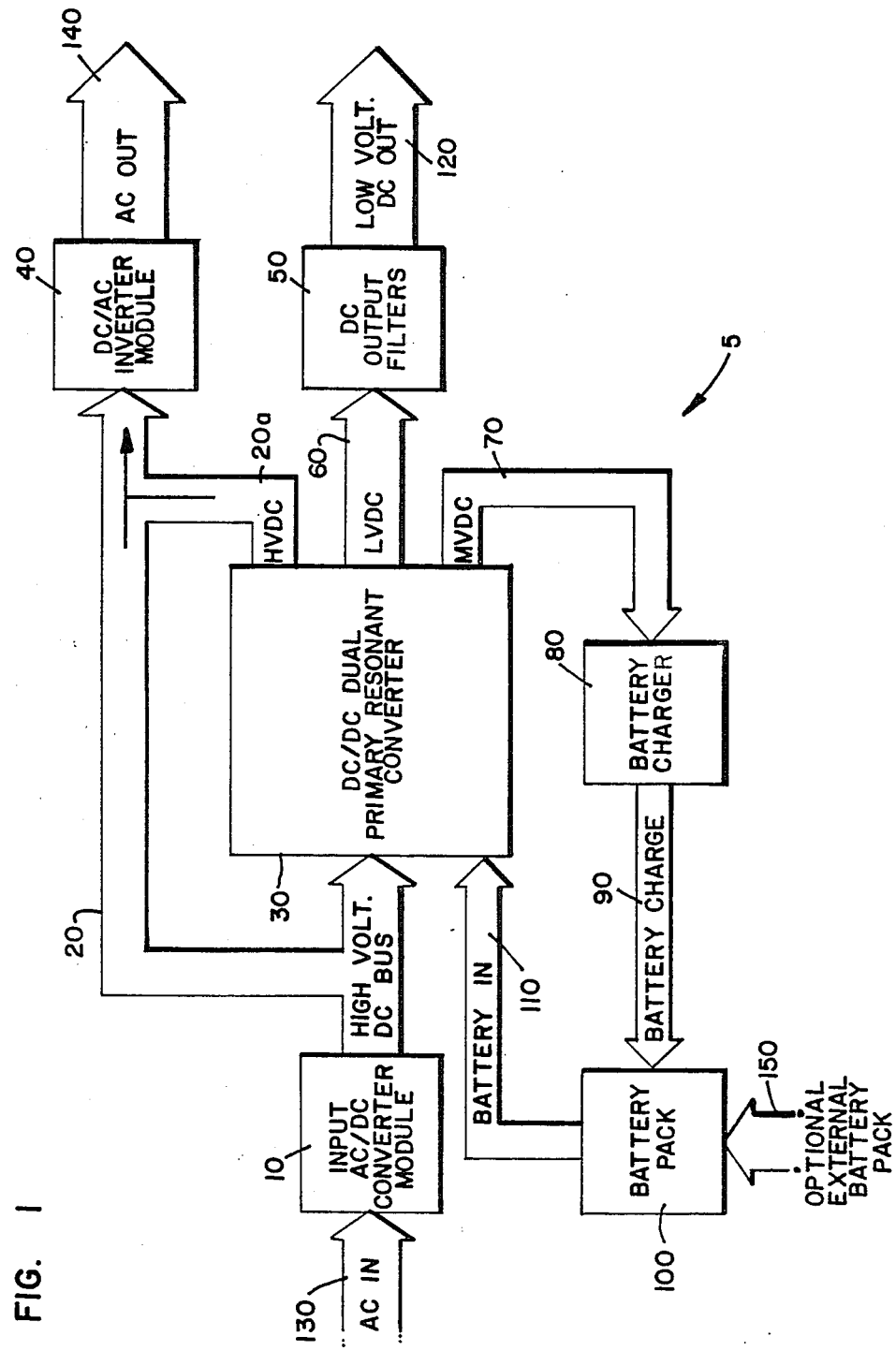
FIG. 1 is a block diagram of the overall integrated uninterruptible power supply of the preferred embodiment of the present invention.

FIG. 1 shows the general topology of the preferred embodiment of the Integrated Uninterruptible Power Supply (IUPS) 5 for personal computers. The instant invention is a drop-in replacement for a conventional computer power supply which provides all of the DC output power needed to run the computer. In addition, the present invention provides uninterruptible AC power to run auxiliary devices such as the computer monitor or printer. Both the DC and AC outputs re provided as conditioned, uninterruptible power sources, power being provided in the event of power line failure by a battery pack which is an integral part of the device but which may or may not be detachable from the housing of the unit. Backup power can also be supplied to the present invention through an external port intended specifically for the purpose of providing additional battery backup. The integrated design and novel topology of the present invention result in an extremely efficient power conversion ratio for prolonged operation from the batteries, and a compactness in overall size allowing the IUPS to fit within the existing cabinetry of most personal computers.

The input module 10 is an AC-to-DC converter which rectifies and filters the input AC line power. The output of input module 10 is a high voltage DC (HVDC) power of approximately 310VDC nominal. This HVDC is placed on the high voltage DC bus 20 which is used to supply one primary of the DC-to-DC dual primary resonant converter 30 and to supply the DC-to-AC converter 40 in normal operation with the AC mains supplying AC input power to input module 10. The HVDC power from the HVDC bus 20 is fed to a first primary on converter 30 (DC-to-DC dual primary resonant converter) which converts this power to low voltage DC (LVDC) for output on line 60 to the computer for driving its circuitry and for output to the IUPS internal control circuitry. The converter 30 also produces a medium voltage direct current (MVDC) output of approximately 50VDC onto bus 70. This medium voltage is used to supply battery charger 80, which in turn provides a charging current to the battery pack 100 via connection 90.

Upon failure of the AC mains 130, power is no longer supplied to the HVDC bus 20 from input module 10. This condition is sensed by a control circuit which automatically and quickly switches to receive power from the battery line 110 to drive the second or auxiliary primary of the DC-to-DC dual primary resonant converter 30. This switch-over occurs completely transparent to the user and without power interruption to the low-voltage DC output 120 or the 60-cycle AC output 140. With battery power supplying the auxiliary primary of converter 30, the output of converter 30 supplies the high voltage DC bus 20 for driving the DC-to-AC converter 40. Since the control circuitry disables the first primary of converter 30 under an AC mains failure condition, there is no feedback loop via HVDC bus 20.

Since the AC output 140 and the low voltage DC outputs 120 are generated by the IUPS and isolated from the AC input 130, the IUPS shown in FIG. 1 provides protection against power line surges, momentary power loss, brownouts, cycle dropouts, spikes, noise on the AC mains 130, etc. Thus, the IUPS shown in FIG. 1 provides both an uninterruptible power source and input line filtering in on-line operation.

In operation, the control circuitry of the IUPS of FIG. 1 continually monitors the high voltage DC bus to ensure that a proper high voltage DC supply is maintained on the AC mains 130. The battery voltage on supply line 110 driving the auxiliary primary of converter 30 is always in a ready state for supplying power to the converter 30 in case of a low voltage detected on HVDC bus 20 (the control circuitry is described more fully below).

The topology of the IUPS shown in FIG. 1 lends itself to an extremely compact design that allows for plug-compatible replacement of existing power supplies within desktop personal computers. Although the housing of the power supplies varies among different models, the batteries and all operating circuits have been found to neatly and compactly fit within the existing housings for IBM models PC, PC-XT, PC-AT, Zenith model 248-S, Epson Equity, most IBM PC clones, and others. The integration of the design, shown in detail below, allows for a higher efficiency of power conversion in the present design than is available in most existing power supplies of personal computers today. Also, the power conditioning of the present invention filters and removes AC line transients and dropouts which normally cause data loss and other errors in personal computers.

An optional external battery pack may be connected to the IUPS device of FIG. 1 through connection 150. The invention shown in FIG. 1 has been tested on a fully-configured IBM XT computer and found to operate on battery pack 100 for over five minutes. The addition of external batteries through connection 150 can extend this time to a limit selectable by the amount of battery backup the user wishes to transport.

A key advantage of the present invention shown in FIG. 1 is the application of a dual primary resonant converter circuit 30 to an internal uninterruptible power supply circuit. The power flow through the IUPS during normal operations from the mains is as follows. In FIG. 1, AC power comes in input terminal 130 and is rectified and filtered by input module 10 in a single conversion step and is placed on the high voltage DC bus 20. The input module 10 contains input filter capacitors that are placed across the high voltage DC bus 20 and serve to filter the voltage on high voltage DC bus 20 even when AC source 130 is down. The DC high voltage is applied to the main primary of DC-to-DC dual primary resonant converter 30 where it is used to produce three output voltages on three separate windings of the secondary of the resonant converter transformer. Low voltage DC is taken from the converter circuit 30 and filtered on the DC outputs by output filters 50 for use by the computer along voltage supply route 120. A medium voltage DC is also used to drive the battery charger 80, which voltage limits and current limits the power run through the battery charger along line 90 and is used to charge the battery pack 100. In addition, power is available on the high voltage DC bus 20 from the input module 10 to drive the DC-to-AC converter 40. The high voltage DC output of converter 30 does not produce sufficient high voltage DC to affect high voltage DC bus 20 in this mode of operation, and hence has no effect on bus 20.

In battery backup mode of operation, battery voltage from battery pack 100 is supplied to the auxiliary primary of converter 30 through the battery voltage supply line 110. The DC-to-DC dual primary resonant converter circuit 30 uses the lower battery voltage to produce the same low voltage DC outputs on lines 60. In addition, converter 30 produces a slightly lower high voltage DC output on HVDC bus 209 which is used to drive DC-to-AC converter 40. This lower high voltage output 20a from converter 30 is still within the operating range of converter 40 to produce the requisite AC output voltage on line 140. This high voltage DC output from converter 30 utilizes the filter capacitors in input module 10 which are attached across bus 20. These filter capacitors in input module 10 help to smooth the lower high voltage output of converter 30. The battery charger 80 is disabled during this mode of operation so that a closed loop through the converter 30 is not produced which would ultimately drain the battery at a faster rate due to the small inherent conversion inefficiency of converter 30 and battery charger 80.

The high voltage DC on HVDC bus 20 is never allowed to drop below 180 VDC during battery backup mode. This is the minimum voltage required for DC-to-AC converter 40 to allow it to produce the requisite 120VAC for supplying approximately 200 watts of power. Control circuitry for the IUPS (discussed more fully below) automatically senses when the AC power on AC input 130 drops below the requisite threshold of supplying high-voltage DC bus 120 to drive DC/DC converter 30 and DC/AC converter 40. Hysteresis is built into the control circuitry to ensure that the IUPS device does not oscillate between battery backup and line voltage backup during momentary brownouts or loss of power. For example, the high voltage DC bus 20 nominally runs at 310VDC for a 120VAC input on line 130. When the HVDC bus 20 drops below 240 VDC, the control circuitry causes the IUPS to switch to battery backup and the auxiliary primary of DC/DC converter 30 is enabled and the main primary of converter 30 is disabled. The battery backup mode of operation will remain until the voltage on HVDC bus 20 rises above 260VDC. At this point, the control circuitry causes the IUPS to switch to on-line mode, enabling the main primary of DC/DC converter 30 and simultaneously disabling the auxiliary primary of DC/DC converter 30. The IUPS will then remain in on-line mode unless or until the voltage drops 240VDC. Thus, hysteresis prevents most oscillations occurring between battery backup and on-line mode.

The high degree of efficiency which is attained with the present invention and which allows it to be compactly installed within existing cabinetry of personal computers is derived from the integrated design structure of the present invention. This integrated design, more fully discussed below, uses many common components between the blocks shown in FIG. 1 for common purposes, and all of the components of the design have been optimized for only the power handling capabilities requisite to implementing this design. The DC/DC dual primary resonant converter is the heart of this design, which allows two power sources to be alternately applied to a single transformer to produce multiple voltages on the output. It will be appreciated by those skilled in the art upon reading and understanding the specification of the present invention that this DC/DC dual primary resonant converter of the present design has applications in other areas of power supply art.

IUPS System Level Control

Figure 2:
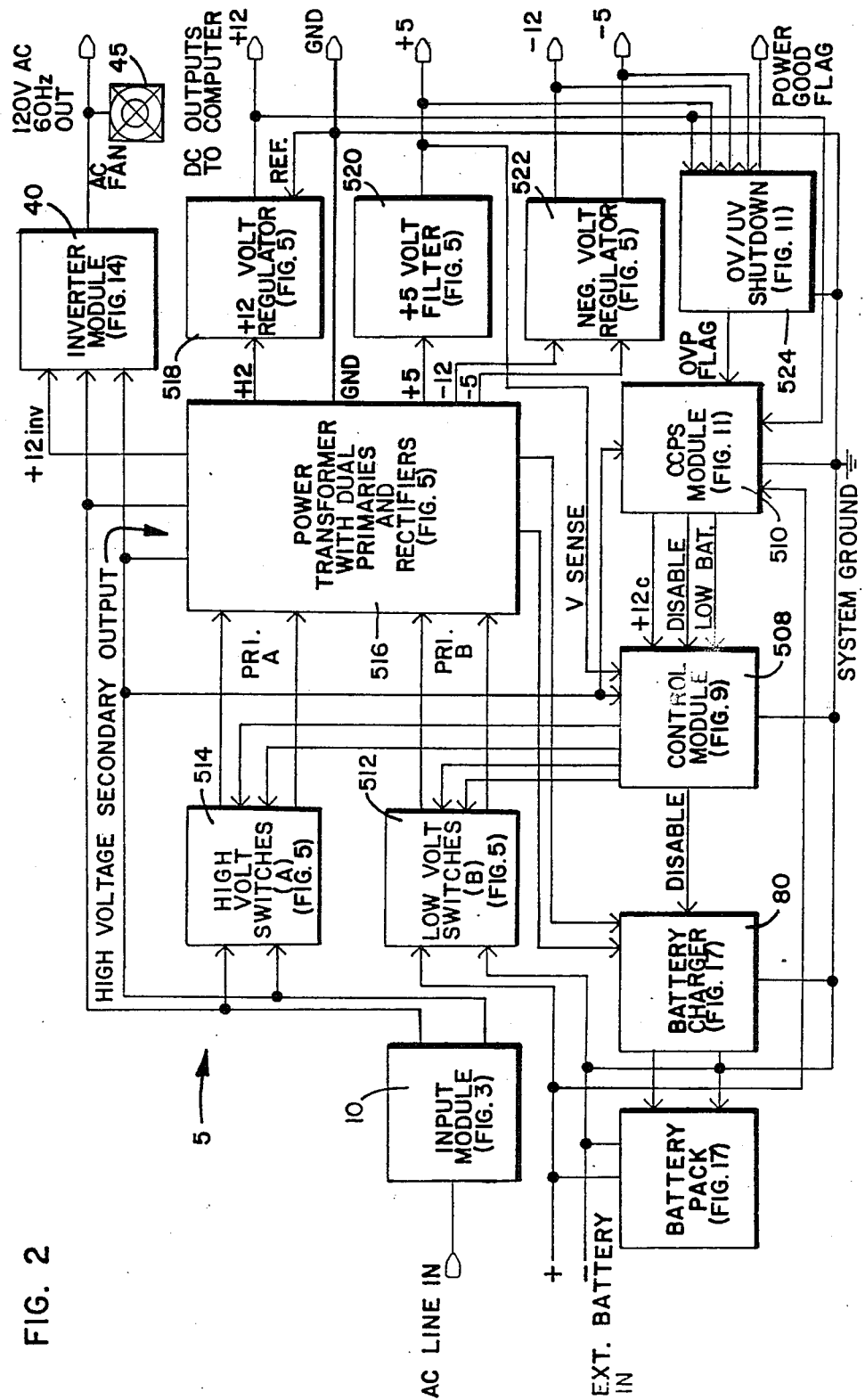
FIG. 2 is an intermediate-level block diagram of the preferred embodiment of the present invention showing the voltage and control lines at a more detailed level than that shown in FIG. 1.

The intermediate level block diagram shown in FIG. 2 indicates the power flow paths through the IUPS and the control lines between the various modules. The layout of FIG. 2 is generally similar to that of FIG. 1 as to the position of the various modules.

Input module 10 drives the ±HVDC bus on two wires which are used to supply the HVDC to the high voltage switches 514 which in turn drive the power transformer with dual primaries and rectifiers 516. The ±HVDC lines also drive the inverter module 40 to supply power for the 120VAC 60 Hz output. The second source of power for the IUPS of FIG. 2 is the battery pack 100 which in the preferred embodiment of the present invention is a +48VDC battery pack comprised of starved electrolyte sealed lead acid batteries available from Yuasa Company of Japan with offices in Los Angeles, Calif., and other off-the-shelf vendors of rechargeable batteries. Battery pack 100 drives the low voltage switches 512, which in turn drive the low voltage primary of the power transformer with dual primaries and rectifiers 516. The rechargeable battery pack 100 is driven with a 54VDC charging voltage from battery charger 80. A disable line from control module 508 enables/disables the battery charger 80, depending on the mode of operation of the IUPS. In battery backup mode, the battery charger will be disabled to conserve energy. Battery charger 80 is driven from the MVDC outputs of the power transformer 516 with approximately 100VDC. This power is stepped down and regulated to supply the battery pack 100 from battery charger 80.

The power transformer with dual primaries and rectifiers 516 produces the ±12VDC and the ±5VDC necessary to drive the computer. These outputs are regulated by a high current +12V regulator 518 for the +12V output and a high current +5V filter 520 for the +5V output. The −5V and −12V outputs of power transformer 516 are relatively lower in current demand from the computer and hence off-the-shelf linear voltage regulators are used in negative voltage regulator module 522. In addition to the computer supplies and the MVDC output, the power transformer 516 also produces an HVDC output to supply the high voltage bus during battery backup mode. The voltage supplied for the HVDC bus from the power transformer 516 is generally lower in voltage than the voltage supplied by input module 10, and so there is very little power loss in power transformer 516 when the IUPS is driven from the AC line input through input module 10. When the voltage on the HVDC bus drops due to the loss of AC line power, the high voltage will only drop to the voltage level output on the high voltage secondary of the power transformer 516. Inverter 40 is designed to operate within a wide range of HVDC input voltages, and hence the lower HVDC voltage due to battery backup is sufficient for supplying the 120VAC 60 Hz output of inverter module 40.

Power transformer 516 also produces a +12VDC inverter supply as a separate galvanically isolated supply to drive the inverter module. The +12 INV supply shown in FIG. 12 shares a common return line with the HVDC bus (separated only by a very low resistance current sense resistor). The +12 INV supply is regulated by an off-the-shelf linear regulator due to the low current demands.

The control circuit power supply (CCPS) module 510 receives low DC voltage from two sources: the battery pack and the +12V regulated computer output. During normal operation of the IUPS off the AC lines, power necessary to run the control circuits of control module 508 and the various distributed control circuits within the other modules of the IUPS (except the inverter module 40 which has its own +12 INV galvanically isolated supply) is taken from the +12V regulated output from 12V regulator 518. However, in order to provide a "cold start" capability in which the IUPS is turned on to run off the battery pack 100 when the AC line to input module 10 is dead, an alternate source of supply is required to "bootstrap" the IUPS into operation. This "bootstrap" current comes from battery pack 100 to the CCPS module. In this situation, a step-down voltage from battery pack 100 is used to drive the CCPS module 510 and to supply the operating voltages for the control module 508 and the other distributed control circuits throughout the IUPS. The combination of the battery supply "bootstrap" voltage and the +12V regulated voltage is labeled +12C throughout the various views of the drawings. CCPS module 510 in FIG. 2 shows 12C voltage driving the control module 508. It will be understood that due to the required brevity of an intermediate block diagram such as that shown in FIG. 2, a complete list of all control lines and supply lines is not shown. The complete description of the IUPS at an electrical schematic diagram is shown below.

Control module 508 uses a VCO to control the low voltage switches 512 and the high voltage switches 514 to switch at the appropriate speed the low voltage and high voltage supplies respectively into the dual primaries of power transformer 516. The VCO senses the regulated output voltage on the +5V output through the line labeled V SENSE to control the speed or frequency of the VCO. Close regulation of all the output voltages is accomplished by carefully winding the secondaries of power transformer 516 to provide close tracking (described in detail below). The control module 508 also senses the high voltage secondary output to determine when to invoke the low voltage switches upon failure of the AC mains.

As a portion of several safety factors built into the IUPS of the present invention, an overvoltage/undervoltage shutdown module 524 is included to inhibit operation of the IUPS upon failure of the output voltages to track within the required tolerances of the computer to which it is attached. OV/UV shutdown module 524 senses the +12VDC and +5VDC outputs to check both their tracking and their tolerance to ensure that they stay within the specifications. When all power is brought up during the initial power-up of the computer and the IUPS, a POWER GOOD flag is sent to the computer as required in the design of many personal computers. The POWER GOOD flag indicates that the IUPS is operating properly. In addition, the OV/UV shutdown module 524 provides an overvoltage protection (OVP) flag to the CCPS module 510 to provide a shutdown of the IUPS should a failure of any one of the positive regulated DC outputs occur.

Connected to the AC output 140 of DC/AC inverter module 40 is AC fan 45. This fan is used to cool the inside of personal computer cabinets and to cool the IUPS. Most personal computers employ a brushless DC fan powered by one of the existing power supply DC outputs for cooling the existing power supply and the personal computer cabinet. The present invention uses an AC fan 45 connected to the uninterruptible AC output 140. This AC fan 45 is more efficient than DC fans, provides more cooling capability, and typically costs less. The AC fan provides the additional benefit of a minimum load attached to the output of the inverter module 40.

Input Module

Figure 3:
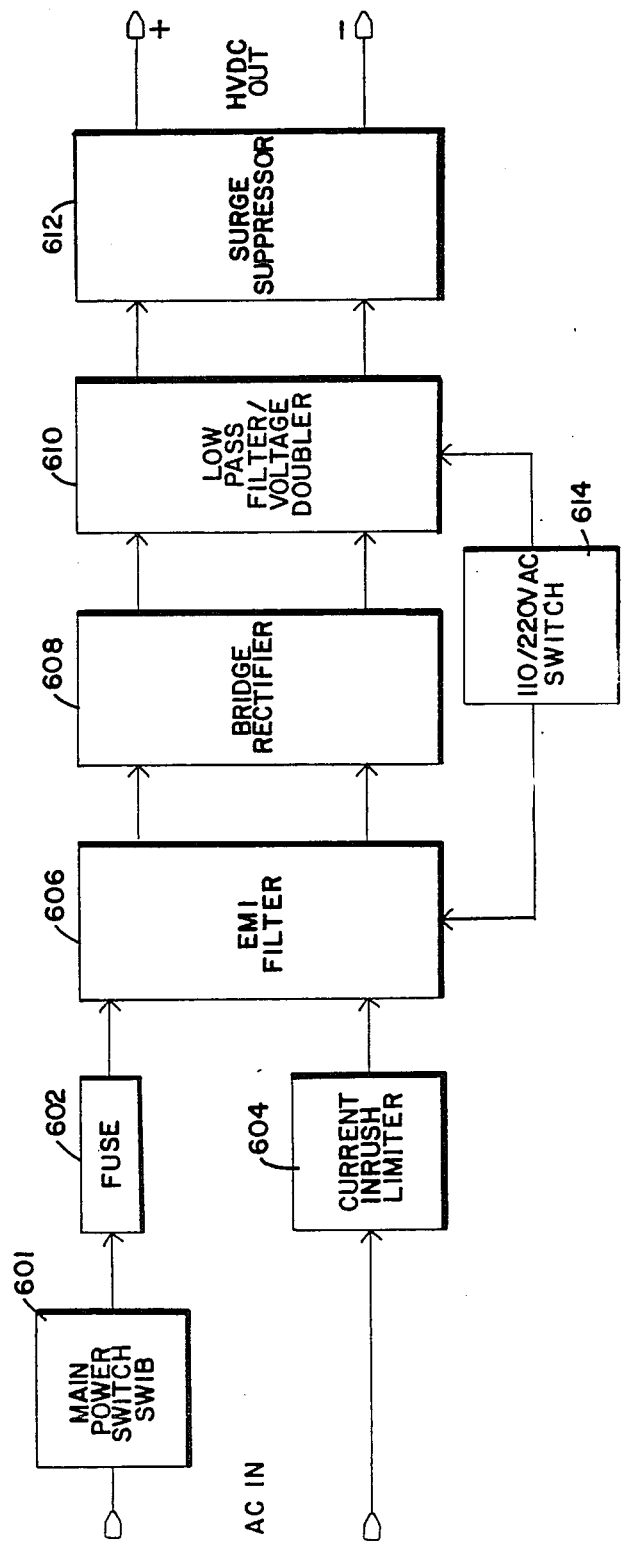
FIG. 3 is low-level block diagram of the input module for the AC/DC converter 10 shown in FIGS. 1 and 2.

A block diagram description of the input module is shown in FIG. 3. The AC mains are supplied from a standard 120VAC 60 Hz line current as commonly found throughout the United States and Japan. Through the operation of a switch 614, the IUPS can be configured to operation off 220VAC line voltages as commonly found in many European countries. This allows the PC to which the IUPS is attached to be portable and operable in most of the countries around the world. As will be described in detail below, regardless of the AC input line voltage, the AC output of the IUPS produces a regulated 120VAC 60HZ ±10% voltage to drive the monitor and other off-board peripherals of the PC. Thus, a PC designed for use in the United States or Japan using a monitor, printer or other peripherals that run exclusively off 120VAC 60HZ power can be transported to, for example, Great Britain and operated without the use of separate power conversion modules to power the monitor and other peripheral components. All the user need do is to change switch 614 to operate the IUPS off 220VAC mains and the monitor and other peripheral components can remain plugged into the back of the IUPS of the PC and operate without any external power conversion circuits. It will of course be understood by those skilled in the art that the inverter module 40 may be easily modified to produce 220VAC outputs at 50 Hz to make the IUPS compatible with European mains.

Main power switch 601 (labeled SW1B in the electrical schematic diagrams) is one-half of a double pole single throw switch. The other pole of this switch is found in the CCPS module electrical schematic diagram FIG. 12. Fuse 602 protects the AC line from catastrophic failures of the IUPS. A current inrush limiter 604 is also provided on the other side of the AC line to prevent nuisance trips of breakers upon the cold start of several IUPS modules operating off the same circuit of the AC mains.

The input module 10 includes an EMI filter 606 to condition the input line to remove spurious noises and to prevent any spurious noise generated by the IUPS from being returned to the AC line. The AC line is directly rectified by bridge rectifier 608 to produce a pulsed DC voltage which is rectified by a plurality of bulk capacitors found in low-pass filter/voltage doubler section 610. The voltage doubler is controlled by switch 614 which allows the capacitors of the low-pass filter to be configured as a voltage doubler during 110VAC mains operation. The voltage doubler is inhibited during 220VAC mains operation so that the HVDC output of the input module is typically 310VDC regardless of which line voltage is used to supply the IUPS.

Surge suppressor 612 is used to protect the IUPS from AC power line surges as an additional safety feature of the present invention. Surge suppressor 612 serves to protect the IUPS to withstand power line disturbances in compliance with the standard IEEE 472 standard for disturbances caused by overhead switching of high voltages. In addition, transient suppression, as defined by IEEE 587 CAT.B standard of impulse protection and ring wave protection, is met.

Figure 4:
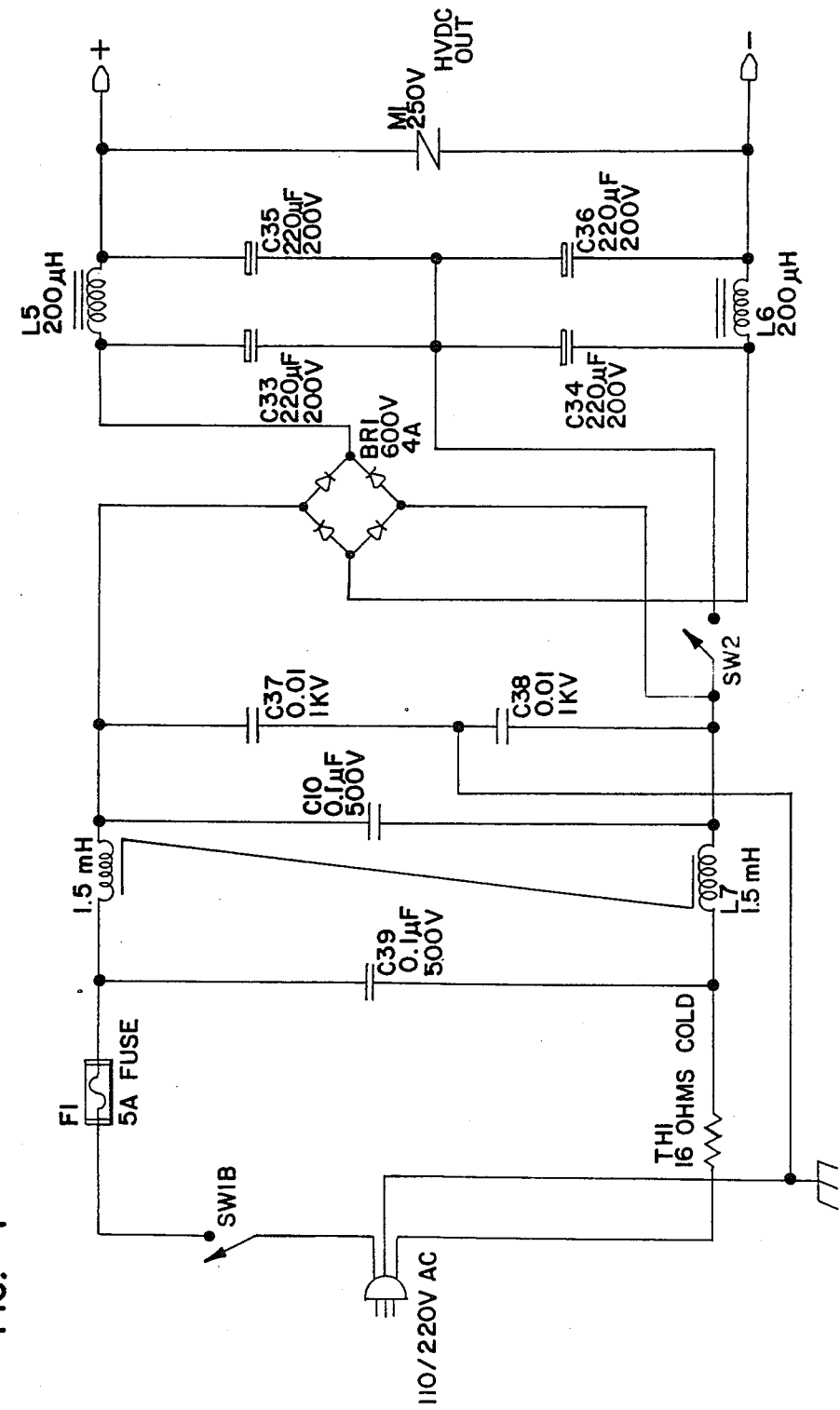
FIG. 4 is a detailed electrical schematic diagram of the input module.

FIG. 4 shows a detailed schematic diagram of input module 10. Switch SW1B serves to switch the "hot" side of the AC input line, which is then protected by fuse F1. The return side of the AC line is protected against current inrush by thermistor TH1, which in the preferred embodiment has a value of 16 ohms when cold. TH1 is an NTC (Negative Temperature Coefficient) thermistor which, when cold, exhibits a high resistance which limits inrush currents when the IUPS is switched ON. Shortly thereafter, TH1 heats up, and its resistance drops in order to pass sufficient current for normal operation.

Capacitors C37 and C38 form the EMI input filter which removes common mode noise from the AC lines. The AC line voltage is filtered by bridge rectifier BR1, which in the preferred embodiment is rated for 400V peak at 4 amps. This bridge is rated for such high current since the current demands of the AC output of the IUPS is higher than most power supplies for personal computers.

The rectified AC voltage (pulsed DC voltage) is applied to capacitor filter network comprised of capacitor C33, C34, C35 and C36. These capacitors in the preferred embodiment are 220 microfarads rated at 200V peak. Capacitors are arranged as a voltage doubler such that when switch SW2 is closed, the positive-going rectified AC pulses are applied to capacitors C33 and C35 and the negative-going rectified AC pulses are applied to capacitors C34 and C36. The resultant output voltage on the HVDC bus is then twice the pulsed DC voltage out of bridge BR1. When switch SW2 is open, capacitors C33 and C34 connected in series have a resultant value of 110 microfarads rated at 400V peak. The same is true for capacitors C35 and C36 with SW2 open.

Inductors L5 and L6 are in the preferred embodiment 200-microhenry inductors used for additional filtering and for removing differential mode noise from the HVDC bus. The output of these inductors is surge protected by metal oxide veristor (MOV) M1 rated for a breakdown voltage of 250V. This surge protector is to remove large voltage spikes resulting from noise on the AC lines, proximal lightening strikes, etc., in compliance with IEEE 472 standards. MOV M1 will begin clamping at approximately 400V to remove any very high voltage spikes to protect the circuitry downline on the HVDC bus. The surge protector M1 is placed on the HVDC bus so that a single valued MOV may be used to protect either 110V operation or 220V operation from AC mains.

Primary Side of the Dual Primary Resonant Converter

Figure 5:
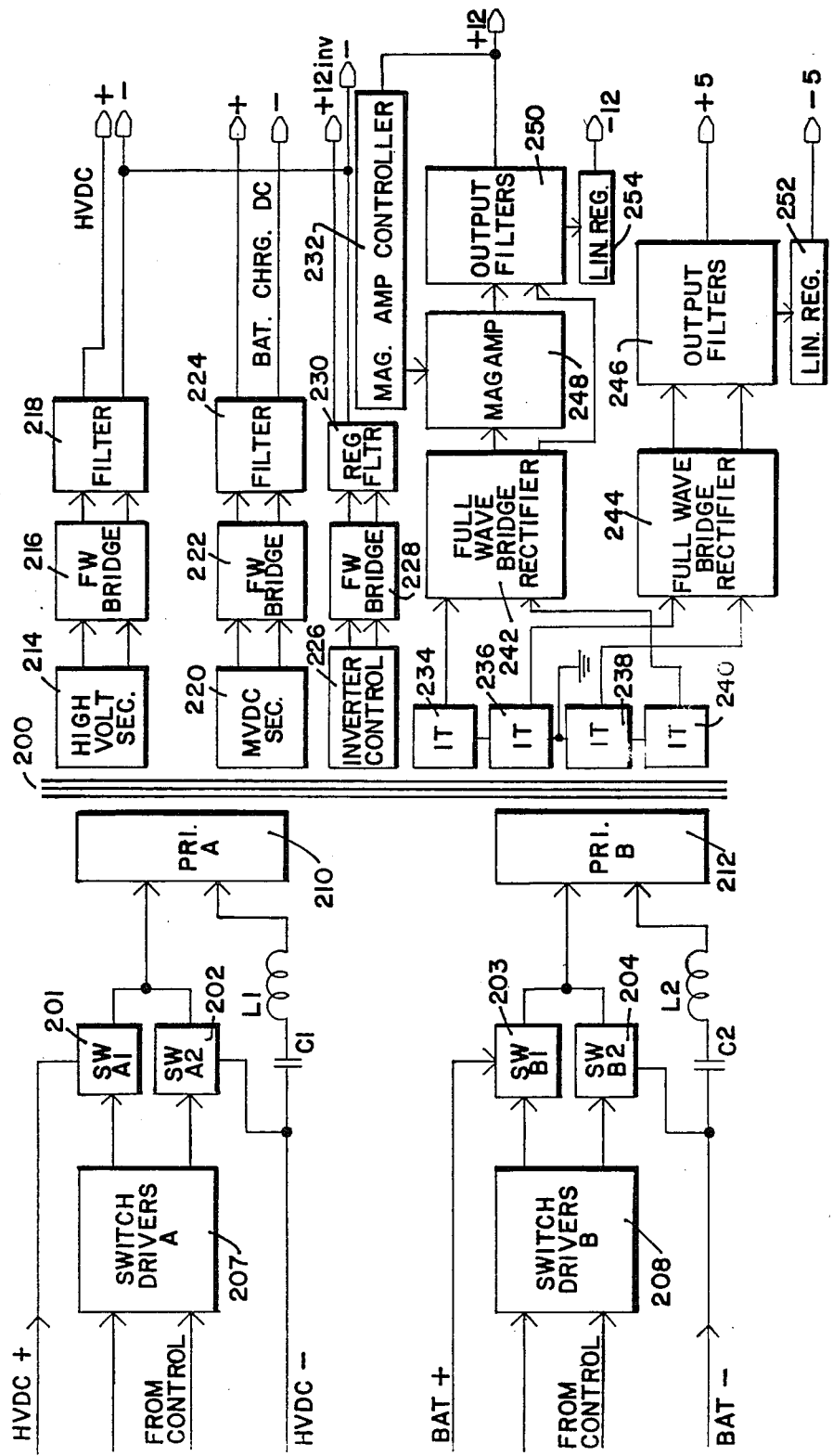
FIG. 5 is a low-level block diagram of the primary and secondary circuits of the DC/DC dual primary resonant converter.
Figure 6:
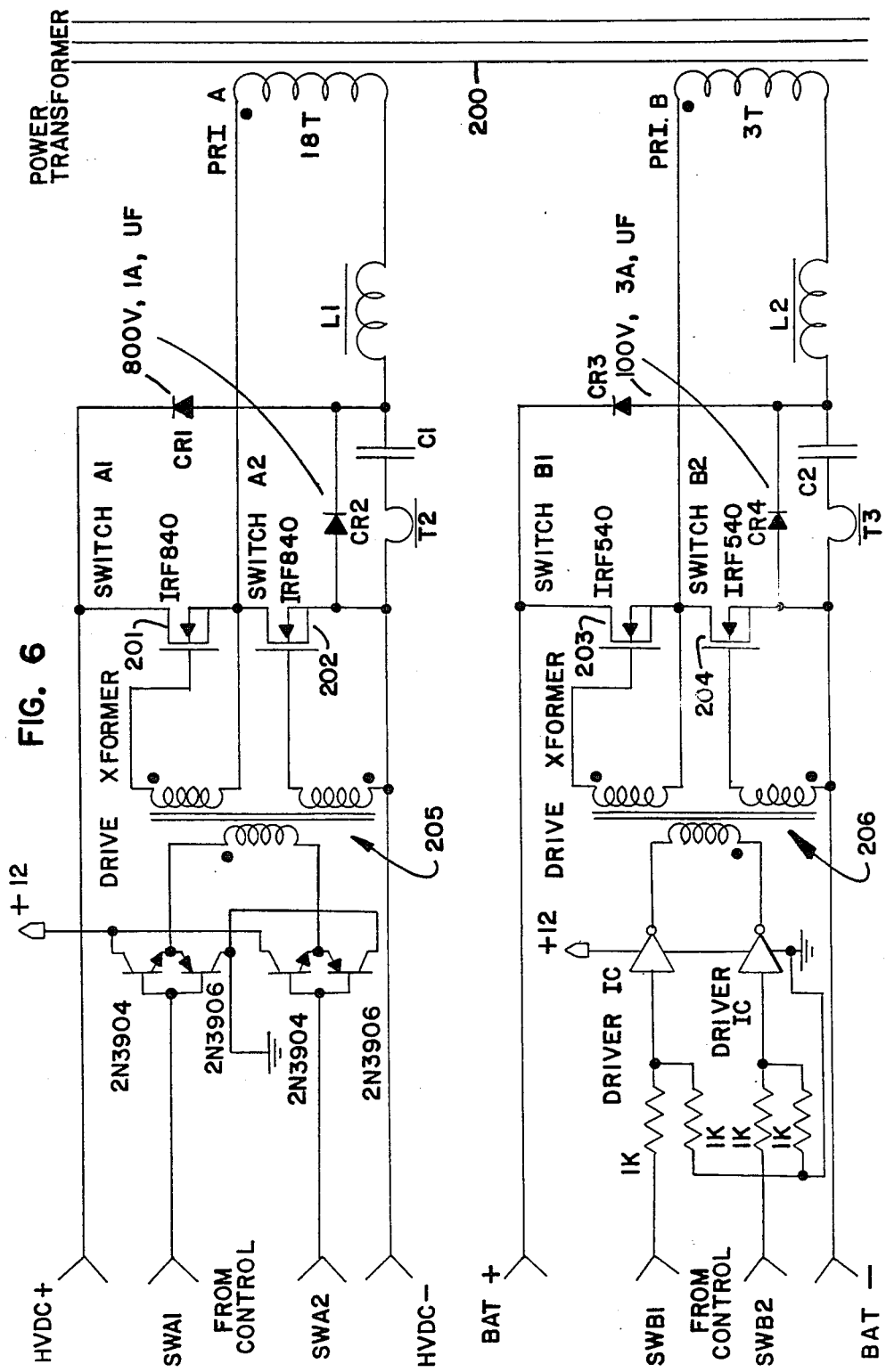
FIG. 6 is a detailed electrical schematic diagram of the dual primaries of the DC/DC dual primary resonant converter circuit.

Referring to FIGS. 5 and 6, the details of the primary side of the power transformer of DC/DC dual primary resonant converter 30 are shown. The general description of the primary and secondary sides of this power transformer is shown in FIG. 6 and described below. The main requirement in using a dual primary power transformer 200 in the main converter 30 having two separate voltage sources is that if there is not some sort of blocking impedance or switch between the two primaries, then the inactive primary will act as a secondary in relation to the driven primary. Also, if the dual primaries are driven at different voltages, the lower voltage primary will act as a secondary and will be driven by the higher voltage primary. Thus, the primaries cannot be allowed to be active at the same time, and an impedance must be switched into the inactive primary to prevent it from drawing off all the power injected by the active primary. Although it is possible in theory to fix the windings ratio of a dual primary transformer to prevent this problem, in reality unacceptable peak currents would result which would destroy the efficiency of the present invention and make it unsuitable for the present application.

To overcome the aforementioned problems, and to gain the high degree of efficiency and compactness necessary for the present application, each primary is driven by a series resonant converter circuit which limits the peak currents that would occur in such a condition as one primary driving the second primary as a secondary. In addition, both series resonant converter circuits are not driven simultaneously, so under normal conditions there will not be a reverse power flow due to one primary overriding the second primary. Under any fault conditions, the series resonant converters will limit any peak currents that may occur, such as when one primary is driving or overriding the second primary.

In the present dual primary resonant converter, series resonant converter circuits are used and are comprised of capacitor C1, inductor L1 and the windings of primary A for the HVDC series resonant converter driving the main primary. The auxiliary primary series resonant converter is comprised of capacitor C2, inductor L2, and the windings of power transformer 200 corresponding to primary B. In order to maintain zero current switching in both resonant circuits, the resonant frequencies are selected to be approximately equal. However, the impedances of the two resonant circuits differ because peak currents and voltages differ. Care is taken in the selection of the values of the resonant inductors L1 and L2 and the resonant capacitors C1 and C2 so that while the resonant frequencies are the same, the "Q" values, or "impedance" values of the two circuits correspond to the desired peak currents and voltages for each resonant circuit.

In the preferred embodiment of the present invention, inductor L1 is 13.8 microhenrys, and inductor L2 is 0.15 microhenrys. Capacitor C1 is 0.05 microfarads, 400V peak, part number KA9480 which has been custom-made by ELPAC for a small package with better ripple current ratings and more exact value in capacitance. However, capacitor C1 may be implemented using an off-the-shelf 0.047 microfarads, 400VDC peak, part number 730P473X9400 metalized polypropylene capacitor available from Sprague. Capacitor C2 in the preferred embodiment is 2.6 microfarads, 100VDC peak, part number MDA9481, also custom-made by ELPAC, which is a foil-wrapped polycarbonate capacitor custom made for small package design and better ripple current rating. Capacitor C2 may be substituted with off-the-shelf capacitors by placing two 1.0-microfarad capacitors in series and connecting that series in parallel with a 2.0-microfarad capacitor to get 2.5 microfarads at 100 working volts DC. These capacitors are also available from Sprague carrying part number 735P105X9100NJL for the 1.0-microfarad capacitor, and 735P205X9100PLL for the 2.0-microfarad capacitors.

The operation of the main primary series resonant converter is as follows. When switch A1 is closed, current flows from the +HVDC supply line through power MOSFET IRF840 through primary A, through inductor L1, and ramping up the voltage across capacitor C1 until HVDC voltage is stable across capacitor C1 and current stops flowing through primary A. When this current reaches zero, switch A1 switches off. This switching during zero current flow through transistor 201 (switch A1) results in an extremely smooth low-noise and high-coefficient movement of current through primary A of the power transformer 200. This avoids the attendant switching transients and RFI normally found during switching of current paths through converter circuits. This circuit is designed to operate at over 100 kHz switching frequency, yet will produce extremely low levels of RFI.

The control circuit for the dual primary series resonant converters of FIG. 5 (not shown here but discussed and described more fully below) ensures that switches A1 and A2 operate mutually exclusive to the operation of switches B1 and B2 (FIG. 2). This ensures that the two primaries are not operated simultaneously. The control circuit senses when the HVDC drops below the minimum allowed threshold voltage of 240VDC. Under this condition, switches A1 and A2 are disabled and switches B1 and B2 are enabled and clocked for driving primary B. Thus, the battery backup is invoked when a low voltage is sensed on HVDC bus. Switches A1 and A2 operate in the normal mode where power is drawn from the AC mains. The switchover to battery backup in which switches B1 and B2 are active is transparent to the user and operates within a very small fraction of a single cycle of AC 60-cycle line current. Switches A1 and A2 are galvanically isolated from switches B1 and B2 by isolation transformers 205 and 206 respectively.

Switches 201, 202, 203 and 204 are power MOSFETs available from International Rectifier Corporation. Switches 201 and 202 in the preferred embodiment are IRF840 power MOSFETs for switching high-voltage DC. Switches 203 and 204 are also power MOSFETs, part numbers IRF540, which are rated for lower voltage switching. It will be appreciated by those skilled in the art that a wide variety of switches may be substituted therefor, including SCRs, due to the self-commutating features of the series resonant converters, since the switches operate at zero current. Thus, the present invention does not require a switch that has to be actively shut down by a control wire. Other semiconductor switches that may be useful include triacs, GTO (gate turn-off) SCRs, bipolar transistors, COMFET, a conductivity modulated bipolar transistor, and other semiconductor devices.

During the time that switch A1 is operational, a half-sine-wave current pulse is applied to primary A of power transformer 200 commutated by capacitor C1. At the zero current point, switch A1 shuts off and immediately thereafter switch A2 is enabled which causes a negative half-sine pulse to be passed through primary A commutated by capacitor C1. Normally, resonant converter circuits will ring when driven in a push-pull fashion of the type shown in FIGS. 5 and 6, which in turn will cause high voltage buildup on capacitors C1 and C2 of the dual primary resonant converter circuits. Diodes CR1 and CR2 for the high voltage resonant converter circuit and CR3 and CR4 for the medium voltage resonant converter circuit are positioned to ensure that there is no high voltage buildup on capacitors C1 and C2 respectively. CR2 restricts the negative voltage buildup across capacitor C1 to approximately one diode drop (0.7V typically). In a like fashion, diode CR1 limits positive voltage buildup to approximately HVDC levels maximum. CR4 and CR3 operate in identical fashion to that previously described for CR2 and CR1. CR1 and CR2 in the preferred embodiment are 1-amp ultrafast diodes rated at 800V breakdown. CR3 and CR4 in the preferred embodiment are 3-amp ultrafast diodes rated at 100V breakdown. Although ultrafast diodes are displayed in the preferred embodiment of the present invention, medium-speed switching diodes of the appropriate breakdown voltage such as the 1N4006 class of rectifier diodes would suffice.

During on-line operation (where the power is being supplied by the AC mains), primary A of power transformer 200 shown in FIG. 6 receives positive and negative pulses due to the switching of switches A1 and A2. The control circuitry (more fully described below) varies the frequency of these pulses according to the voltage found on the HVDC bus. The control of the input current pulses to primary A is performed by means of a voltage controlled oscillator (VCO) operating to compensate for line voltage fluctuations which are reflected in the HVDC bus and for output lead fluctuations.

Drive transformer 205 is used to isolate the drive signals SWA1 and SWA2 from switching transistors 201 and 202 respectively. In a like fashion, drive transformer 206 is used to isolate drive signals SWB1 and SWB2 from the control circuitry from the switching transistors 203 and 204 of the auxiliary primary B of power transformer 200. Those skilled in the art will recognize that alternative drive control techniques can be used to drive switches A1, A2, B1 and A2, such as direct drive, a resistive drive technique using high voltage pull-down transistors on the bases of the aforementioned switching transistors, and other direct and indirect drive techniques.

During battery backup mode of operation, primary A is disabled through the control circuitry and primary B is activated to drive the power through power transformer 200 to the secondaries. The control circuitry is designed to carefully ensure that the switches A1 and A2 of primary A are off while the switches B1 and B2 of primary B are being used to transfer power. In this fashion, one primary does not try to buck the other primary for efficiency purposes.

It is possible to allow switches A1 and A2 to operate simultaneously with switches B1 and B2 such that both primaries are driven simultaneously. The net effect of this operation would be to provide a lower voltage on primary B, which in effect would appear as a "float" on power transformer 200 such that if the voltage on primary A would drop below the ratioed voltage on primary B, primary B would begin to transfer power in lieu of primary A. However, this technique is not as efficient as ensuring complete mutual exclusivity between switch A drivers 207 and switch B drivers 208.

Inherent in the use of a dual primary power transformer such as that of the present invention is the fact that a voltage will be induced on the undriven primary by the driving primary. In the circuit of FIG. 6, the driven primary B, for example, will induce a voltage across primary A, which will result in a minimal amount of leakage losses through switches A1 and A2. MOSFETs 201 and 202 have internal diodes which are inherent in the construction of MOSFETs. These diodes allow a small amount of leakage current to pass through these diodes on the undriven primary. In a like fashion, when primary A is the driven primary and primary B is undriven, a small amount of leakage current will be found through MOSFETs 203 and 204. These losses, however, are minimal and do not degrade the efficiency of the power transfer through converter 30.

A variant on the use of the dual primary transformer of the present invention would be to allow reverse power flow through the undriven primary to service, for example, the recharging of the battery by reverse current flow through primary B (which is driven from the battery). For example, while primary A is being driven, a reverse power flow would be allowed to be returned through primary B and fed back to the battery to float charge the battery. In an opposite action, when the battery voltage is driving primary B of power transformer 200, primary A could act as a secondary supplying the high voltage DC bus. Those skilled in the art will recognize that the aforementioned reverse power flow techniques could be utilized to accomplish this result. This blurs the distinction between primaries and secondaries of the power transformer in that the dual primaries may now act as dual primary/secondaries. However, the present preferred embodiment is the best mode of practicing the present invention for the most compact and efficient operation of the IUPS.

MOSFET switches 201 and 202 for primary A and switches 203 and 204 for primary B are protected from current transients on the undriven primary by L1 and L2 respectively. For example, when primary B is driven in battery backup mode, L1 prevents current transients from damaging MOSFETs 201 and 202 by limiting the peak current flow through primary A acting as a secondary. These large current transients typically would occur when loads are being switched on and off on the outputs of the IUPS. Transient conditions such as this can result in large current spikes on the undriven primary, but which is dampened by the inductors L1 and L2 associated with primaries A and B respectively. Thus, L1 and L2 perform a dual function in that they are also an integral part of the LC combination for the respective resonant converters.

The Secondary Side of the Dual Primary Resonant Converter

The power transformer 200 has been specifically designed to allow for highly efficient power flow through the windings from the primaries to the secondaries and so that leakage inductances are kept to a minimum. It is carefully constructed to ensure that close tracking between the secondary windings is achieved so that the amount of post-regulation circuitry can be minimized in the secondary circuits. As shown in FIG. 5, single-turn secondaries 234, 236, 238 and 240 are used to produce the ±5VDC and the ±12VDC. The +5V output is regulated by the converter control circuitry and the other output voltages "track" the +5V output. With close tracking, the amount of post-regulator circuitry can be minimized. The close voltage tracking between the main regulated output and the other low voltage DC outputs is achieved despite the relatively high current pulses output by the resonant converter which can otherwise adversely affect tracking. This is accomplished by using quadrifiler wound single-turn secondaries which are constructed from four layers of laminated copper strip wound in a single turn around the transformer core. This achieves a tight magnetic coupling of all four low voltage turns 234, 236, 238 and 240. The secondary turns are installed on the transformer core by stacking four insulated layers of laminated copper strips together while attaching a connector to each end of each strip. The transformer core is a standard core available from TDK Corporation as part number HC71LP32/13, with a core volume of approximately one cubic inch, and is designed to transfer approximately 300 watts of power.

The primary windings are formed using litz wire, and the single-turn secondaries are formed of thin copper strip to take advantage of the skin effect of the current operating at high frequencies. Since the switching frequency of the dual primary resonant converter circuit shown in FIG. 5 is approximately 100 kHz, thin flat copper strip is better for transferring power due to the skin effect. It will be appreciated by those skilled in the art that multiple turns of thin copper strip could be substituted therefor to effect a close coupling between the primaries and the low voltage secondaries. Due to the skin effect, the copper strip of the single-turn secondaries need not be very thick, since most of the current will travel on the skin of the conductor. In the preferred embodiment of the present invention, the thin copper strip is approximately 2 cm wide×1.4 mils thick. Although the single-turn secondaries 234, 236, 238 and 240 are electrically wired as single-turn secondaries, they are physically implemented with four thin copper strips conductively connected to form the single turn but to present a higher effective surface area to the transformer core to effect a higher power flow in light of the skin effect. The high voltage secondary 214, the medium voltage secondary 220, and the inverter control secondary 226 are all wound with litz wire around the same core. In a like fashion, primaries A 210 and B 212 are also wound with litz wire.

Referring to FIG. 5, power transformer 200 in an ideal environment would transfer power through it based solely upon the turns ratio of the primaries to the secondaries. However, due to the real world leakage inductances inherent in this and all transformers, the exact turns ratio does not determine the exact amount of power transferred through the transformer. In light of these leakage inductances, the optimal design for the power transformer 200 of the present invention is to ensure that the voltage across primary A is approximately one-half of the voltage across the HVDC bus for optimum power transfer. The voltage across primary A 210 of transformer 200 is proportional to the voltages across the various secondaries 214, 220, 234, 236, 238 and 240, which are clamped to approximately the magnitude of the voltage on the capacitors of the output filters. The turns ratio of primary A and primary B to the secondaries has been selected to ensure optimal power flow with a minimum amount of leakage inductance. In the preferred embodiment, primary A 210 of power transformer 200 has been selected to have a turns ratio to secondaries 234, 236, 238 and 240 to be 18-to-1. Secondaries 234, 236, 238 and 240 are one-turn secondaries to minimize the amount of leakage impedance resulting through the power transfer. Primary B is scaled to the windings ratio of primary A to the secondaries such that the lower voltage placed across primary B results in the same output voltages on the secondaries of power transformer 200. Thus, in the preferred embodiment primary B 212 has a turns ratio to the one-turn secondaries 234, 236, 238 and 240 of 2-to-1.

In addition to the high voltage secondary 214, the medium voltage secondary 220 and the single-turn low voltage secondaries 234, 236, 238 and 240, an additional secondary winding 226 is provided to power the inverter control circuitry. This is a low voltage secondary which is galvanically isolated from the low voltage outputs for the personal computer.

Even though the power transformer 200 is of a compact size of 1 cubic inch in volume, it will pass 300 watts of power due to the tightly wound primaries to secondaries. The design of this transformer still meets Underwriters Laboratories (UL) standards for transformer design by the use of appropriate high temperature insulated wire and copper strip. The temperature rise in this gapless transformer is limited to 125° C. by allowing the copper strips of single-turn secondaries 234, 236, 238 and 240 to serve a dual purpose of acting as heat sinks for the transformer core. The copper strips are brought out from the core and electrically and mechanically attached to the PC board onto which they are mounted, using curve configurtation open to free air. The copper strip conducts heat away from the transformer core, and the open air curving of the conductor to the PC board forms a heat dissipation path. Since the power supply contains an integral cooling fan (which also serves to cool the computer cabinet), temperature rise in the power transformer 200 core is limited by the aforementioned design.

Referring once again to FIG. 5, the secondary circuits attached to the dual primary resonant converter 30 are shown in block diagram form. The details of the low voltage side of power transformer 200 are shown in FIG. 4. The voltages across the secondaries of power transformer 200 are established relative to one another based on the turns ratio of power transformer 200. Their effective operating voltage is therefore determined by regulating the voltages on the input primaries 210 and 212 of power transformer 200. These voltages are established by the control circuitry which is discussed more fully below. The +5VDC low voltage secondary output is used as the primary feedback voltage sense line to regulate the voltage on the primaries by the control circuit. Thus, the +5V output is termed the main regulated output. Since the low voltage single-turn secondaries 234, 236, 238 and 240 are so tightly coupled in their windings, the low voltage outputs track very close to one another. Hence, the control circuit need only monitor one of the low voltage outputs in order to regulate all four. It of course will be appreciated by those skilled in the art on reading this specification that a greater or lesser number of windings on the low voltage secondary can be effected to create a greater or lesser number of regulated low voltage outputs.

Figure 7:
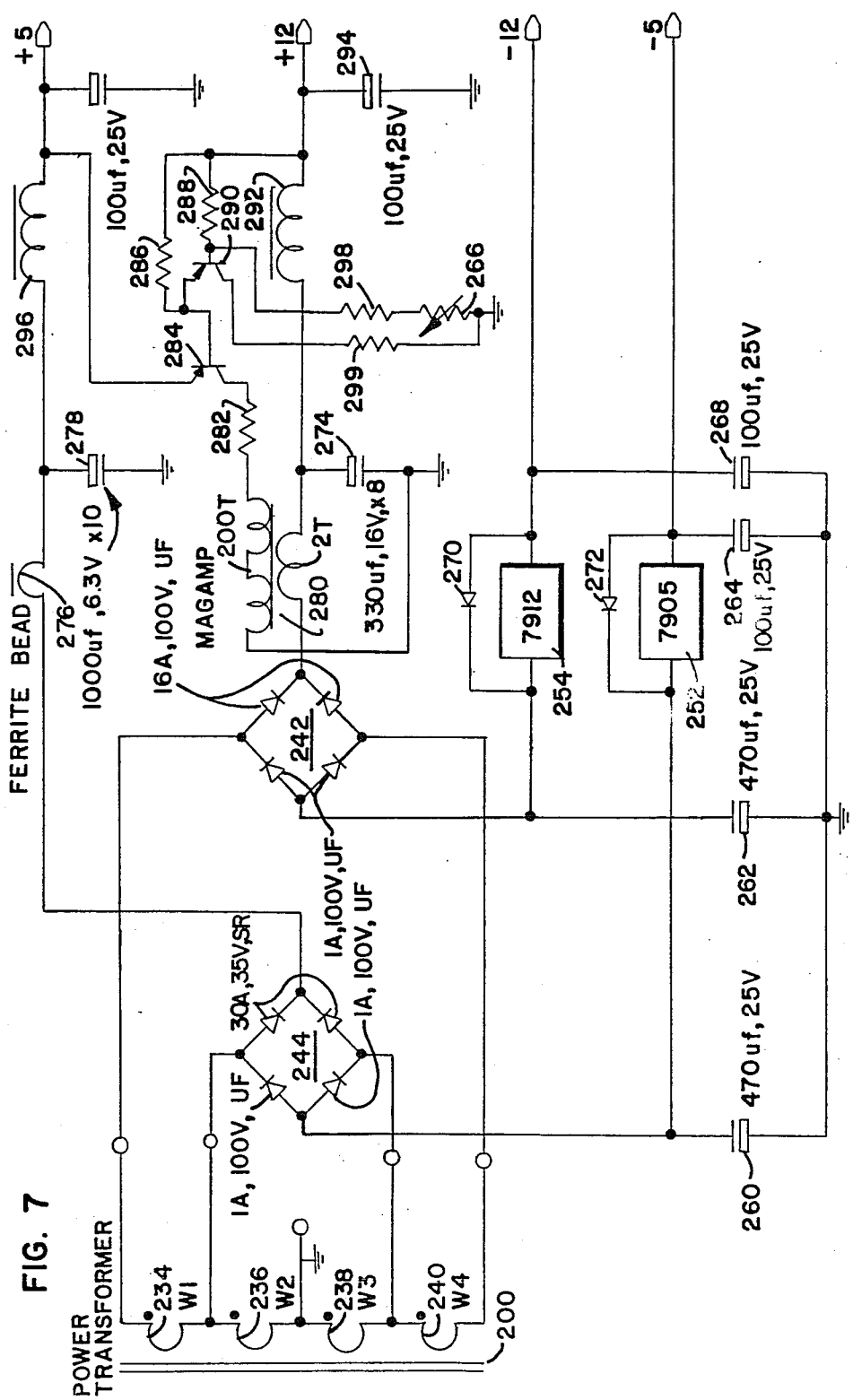
FIG. 7 is a detailed electrical schematic diagram of the low voltage secondary circuits of the DC/DC dual primary resonant converter.

However, due to the very high current pulses, the parasitic resistances and leakages inductances of power transformer 200, the low voltage outputs may require some trimming to place them within the required tolerance limits of the personal computer to which they are applied. Thus, a magnetic amplifier is used in the output of the +12V supply to trim this output in relation to the +5V output. It will be appreciated by those skilled in the art that the +12VDC and the +5VDC outputs on the low voltage bus for the personal computer are the high current outputs, and hence any post regulation that is accomplished on these outputs must be performed in a highly efficient manner to minimize the losses during battery backup operation. As shown in FIGS. 5 and 7, however, the −12VDC and −5VDC outputs use linear regulators 254 and 252 respectively, since their outputs are low-current outputs and the losses inherent in the linear regulators are acceptable to the overall efficiency of the operation of the IUPS. In the preferred embodiment, an LM7912 linear regulator is used to regulate the −12VDC output and an LM7905 linear regulator 252 is used to regulate the −5VDC output, both regulators available from National Semiconductor and other vendors.

A magnetic amplifier is used to trim and regulate the +12VDC output in relation to the +5VDC output as described below. The +5VDC output is set and regulated by the control circuitry as also described below.

The single-turn windings 234, 236, 238 and 240 are connected in series on power transformer 200 to derive the ±5VDC and ±12VDC outputs. Inner windings 236 and 238 serve as a center tapped output from transformer 200 and supply full wave bridge rectifier 244 for the ±5VDC output. Bulk capacitor 260 serves to filter the −5VDC output ahead of the linear regulator 252. A bank of bulk capacitors 278 are used on the +5VDC output ahead of a single ferrite bead 276 which is used to remove high frequency noise and to effectively boost the +12VDC output (as described below). Inductor 296 (10-microhenry, 20-amp) in series with the +5V output is used for transient suppression and additional smoothing of the output current. The outer windings 234 and 240 of power transformer 200 are used to supply a full wave bridge rectifier 242 for the ±12VDC output. Bulk capacitor 262 serves to filter the −12VDC output ahead of linear regulator 254.

The +12VDC output is trimmed using a magnetic amplifier which is controlled in relation to the +5VDC output. The magnetic amplifier uses saturable inductor 280 to place a controlled impedance in series in the 12VDC output between full wave bridge rectifier 242 and filter inductor 292 (10-microhenry, 7.5-amp). The power winding of saturable inductor 280 is a two-turn dual primary in series with the +12V output while the secondary is a 200-turn winding through which a controlled current flow is passed, creating a fixed impedance on the primary. Since the current through the secondary of magnetic amplifier transformer 280 determines the controlled impedance through the primary, the current through the secondary is tied proportional to the voltage on the output of the +12VDC supply. The current through transistor 284 supplied from the +5VDC output is passed through resistor 282, through the secondary of magnetic amplifier saturable inductor 280 onto ground. The current through transistor 284 is controlled in a conventional manner by supplying a fixed amount of bias voltage to the base of transistor 284. Trimming resistor 266 is used to trim the appropriate amount of voltage fixed on the base of transistor 284 by means of controlling the voltage at the base of transistor 290. Thus, the +12VDC output is carefully trimmed to supply a personal computer.

The saturable inductor 280 of the magnetic amplifier is constructed using two small stacked toroids through each of which a double-turn loop of wire is passed for the primary (two turns through each toroid). The secondary has 200 turns through both toroids through which a controlled current is passed to control the amount of saturation of the toroid core. Each of the two small toroids is in the preferred embodiment hand-wound around standard Ferroxcube cores, part number 266T125-3E2A. The power winding (primary) is in series, and the bias winding (secondary) is in anti-series so that the EMF induced in the bias winding is cancelled. The amount of saturation of the magnetic material of the toroid core determines the impedance on the primary winding. Thus, by increasing the impedance one can lower the output voltage and by decreasing the impedance the output voltage will rise. Magnetic amplifiers of the type shown in FIG. 7 are only designed to operate on pulsed DC voltages or AC voltages. Since the magnetic amplifier transformer 280 is attached directly to bridge rectifier 242, the magnetic amplifier has an opportunity to act on the current before it is filtered into steady DC voltage.

As shown in detail in FIG. 7, the four quadrifiler wound low voltage secondaries 234, 236, 238 and 240 have a 1-to-1 turns ratio such that the inner windings (windings 2 and 3) produce a voltage which is approximately one-half that of the outer windings (windings 1 and 4). Since the LVDC output requirements call for a ±5VDC output and a ±12VDC output (which is more than twice the required 5V output), a ferrite bead 276 is inserted in series with the +5V regulated output line to provide additional impedance on the output current pulses from full wave rectifier 244 to effectively boost the voltage across windings 234, 236, 238 and 240 such that enough voltage is produced to generate the ±12VDC output and enough impedance is placed by ferrite bead 276 in series with the +5VDC output to produce a regulated 5VDC output. The ferrite bead 276 is in the preferred embodiment a $\frac{3}{8}''$ diameter bead (part number 266T1254C4 from Ferroxcube) which contributes just enough impedance to create a voltage drop necessary to produce both 12V and 5V outputs. The ferrite bead 276 can be likened to the magnetic amplifier discussed above, except the impedance inserted by the ferrite bead is uncontrolled and relatively fixed, in that the impedance decreases with increasing current drawn by the 5V load, due to saturation of the ferrite material.

The inverter control secondary 226 shown in FIG. 5 consists of three turns of litz wire supplying a full wave bridge rectifier 228 in a conventional fashion. Regulator and filter 230 uses an LM7812 monolithic regulator and filter capacitors to regulate and filter the pulsed DC output of full wave bridge rectifier 228 and thus a +12VDC output is provided to power the inverter control circuitry. Since a very small current draw is used for powering the inverter control circuitry, the use of a linear regulator at this point results in a minimal efficiency loss. In this fashion, the inverter control power is galvanically isolated from the low voltage out-puts which are used to supply the personal computer.

Figure 8:
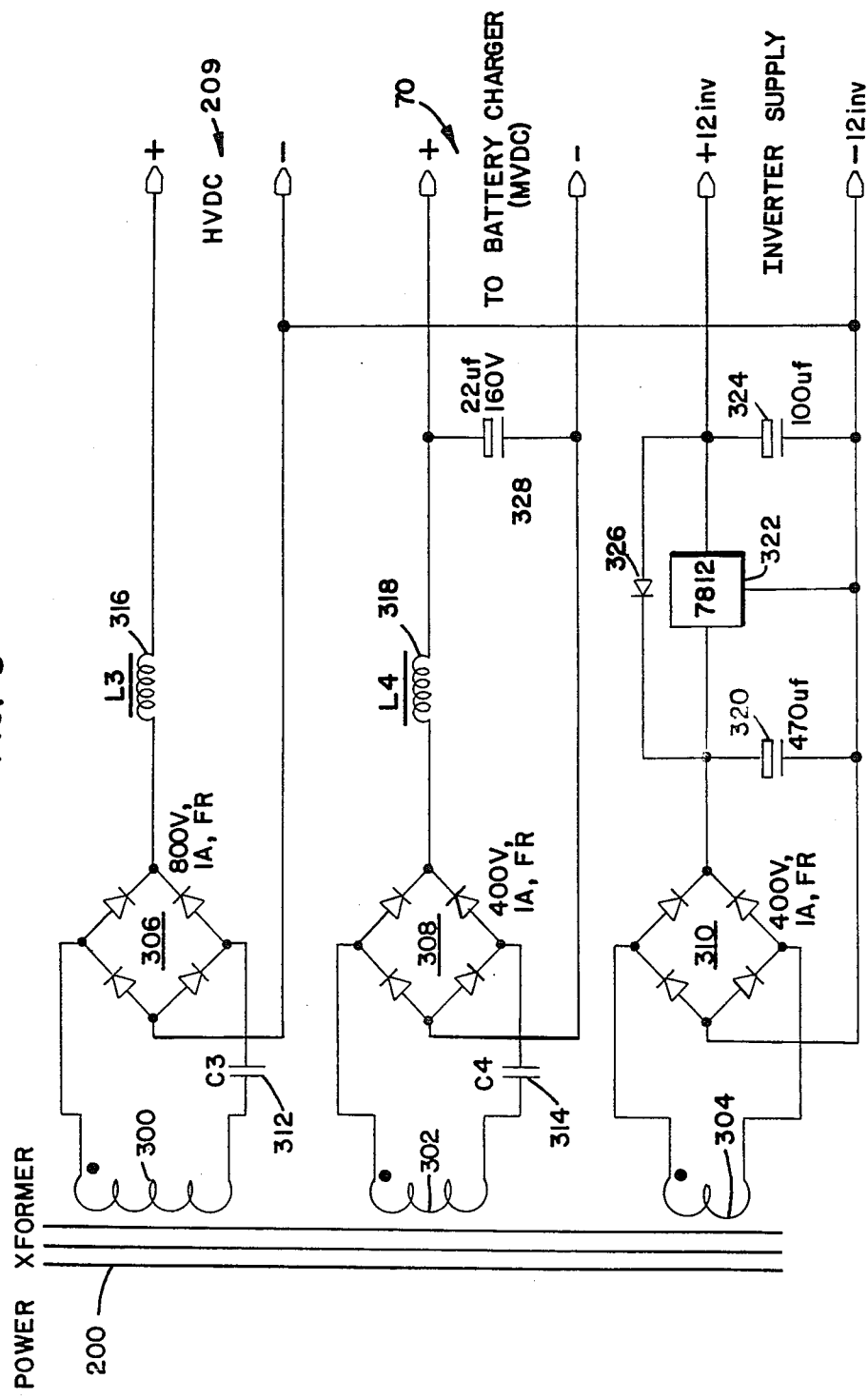
FIG. 8 is a detailed electrical schematic diagram of the high voltage, medium voltage and inverter supply secondaries of the DC/DC dual primary resonant converter circuit.

The details of the inverter control power supply are shown in FIG. 8 along with the detailed schematic description of the medium voltage DC secondary supply and the high voltage secondary supply. Inverter control secondary winding 304 of power transformer 200 directly drives full wave bridge rectifier 310. Filter capacitor 320 is used to filter the pulsed DC voltage and monolithic linear regulator 322 is in the preferred embodiment an LM7812 available from National Semiconductor. Reverse bias diode 326 is used to protect the monolithic regulator from reverse voltages across the output lines, a minor precaution. Additional postregulation is obtained by filter capacitor 324 across the outputs of the inverter supply.

In normal operation off the AC mains, the high voltage secondary of power transformer 200 is inoperative and does not draw any current through the transformer since the high voltage DC bus is supplied from the AC mains. In addition, the battery charger may or may not be drawing current to charge the batteries through the medium voltage secondary 302 of power transformer 200. In battery backup operation, however, the high voltage DC bus is supplied from secondary winding 300 of power transformer 200 which draws an appreciable amount of current for supplying the AC output 140 from DC to AC converter 40. Also, the battery charger is disabled during battery backup mode, hence no current is being drawn through winding 302 of power transformer 200. Thus, the effective reflected impedance due to the leakage inductances of the secondaries of power transformer 200 are different depending upon the mode of operation of the IUPS.

The low voltage secondary windings of power transformer 200 in FIG. 5 possess leakage inductance, which appears to the primary circuits as an inductance in series with inductors L1 and L2, as an unavoidable consequence of the transformer construction. Inductance values L1 and L2 are chosen so that, in combination with the reflected secondary leakage inductance, the correct resonant frequency is obtained.

The turns ratios of the transformer primaries to the HVDC and MVDC secondaries are much smaller than the turns ratios of the primaries to the LVDC secondaries. Because reflected leakage inductance is proportional to the square of the turns ratio, the MVDC and HVDC secondaries contribute much lower leakage inductance which effectively shorts out the leakage inductance due to the LVDC secondaries. This shorting effect lowers the effective resonant inductance which in turn can allow unacceptably high peak currents in the primary resonant circuits.

In order to prevent this shorting effect, inductors L3 and L4 of FIG. 8 are placed in series with the HVDC and MVDC outputs. L3 and L4 provide a sufficiently high inductance to prevent significant change in the effective inductance of the primary resonant circuit. In the preferred embodiment, L3=42.5 microhenry, 1 amp, L4=22 microhenry, 0.5 amp, C3=0.05 microfarads, 400V, and C4=0.08 microfarads, 200V. All these components are standard, off-the-shelf varieties.

Because L3 and L4 cannot conduct until sufficient voltage rise occurs in the primary resonant circuit, phase shift occurs in the current through L3 and L4 which depends on the HVDC and MVDC load voltages, which could upset the timing of the primary resonant circuit, if L3 and L4 were wired directly in series with their respective secondaries. This problem is avoided by placing L3 and L4 between the bridge rectifiers 306 and 308 respectively, and the HVDC and MVDC outputs respectively, so that any flyback voltages generated by L3 or L4 during the primary current zero crossing are shorted by the two lower rectifiers in the full wave bridge rectifier assemblies 306 and 308 respectively.

Another problem which could potentially occur is that unacceptably high currents could build up in L3 or L4 during a period of many half-cycles, if the HVDC and MVDC outputs were shorted, and if no means were applied to prevent this. The placement of capacitors 312 and 314 prevents the problem by limiting the total charge (and thus the average current) which can be transferred to the MVDC or HVDC load during any given half-cycle.

In effect, a resonant circuit is formed by the combinations of L3, L4 and the capacitors 312 and 314 respectively. In order to minimize feedback loop instabilities, it is best to select inductance and capacitance values for these parts which provide a resonant frequency which is approximately equal to the converter primary circuit resonant frequency.

The secondary resonant circuits match the resonant frequency of each primary but possess such a high impedance that the peak circulating currents in each primary are not significantly altered by HVDC or MVDC loads. Because this impedance isolates the MVDC and HVDC secondaries from the transformer (which then appears as an ideal voltage source), the MVDC and HVDC output voltages change somewhat with load current, but sufficient voltage regulation (or "tracking" is achieved for the application discussed herein.

The selection of the values of the inductors L3 and L4 and the capacitors C3 and C4 are made based on the relative required "stiffness" of the regulation on the output of the HVDC bus and the MVDC bus. For example, close regulation is required on the HVDC bus, requiring a smaller L3 with a larger selected C3 which are matched at the requisite LC resonant frequency used in the primary. However, in the MVDC output, a relatively larger L4 is used to provide less regulation and a correspondingly smaller C4 to retain the matched LC resonant frequency characteristics of the primary. The larger L4 is used to allow for more efficiency in the battery charger circuit, and incidentally reduces the weight and volume of the IUPS.

For example, when the batteries have been discharged, the battery charging circuit supplies a large amount of current in order to recharge them in a short period of time. Once the batteries are fully charged, a small amount of battery charger current is required for a trickle charge. When discharged, the batteries can be charged with a lower voltage. Thus, the selection of L4 is made such that the MVDC output has a relatively less amount of "stiffness" in its regulation, such that when a large amount of current is drawn through the MVDC outputs the MVDC output voltage "sags" and a lower voltage drop results across the battery charger circuit 80 (more fully discussed) below. During this high current pass through battery charger 80, a smaller voltage drop occurs across the battery charger circuit 80 which results in a more efficient conversion and operation. Once the battery charger is operating in trickle charge mode, a small amount of current is drawn from the MVDC bus, and hence there is less "sag" in the output voltage since smaller currents are being drawn through L4. Thus, in this fashion, the power supply is purposely allowed to effect less regulation in return for more efficient operation of the circuitry.

Control Circuit for the Primary Resonant Converter

Figure 9:
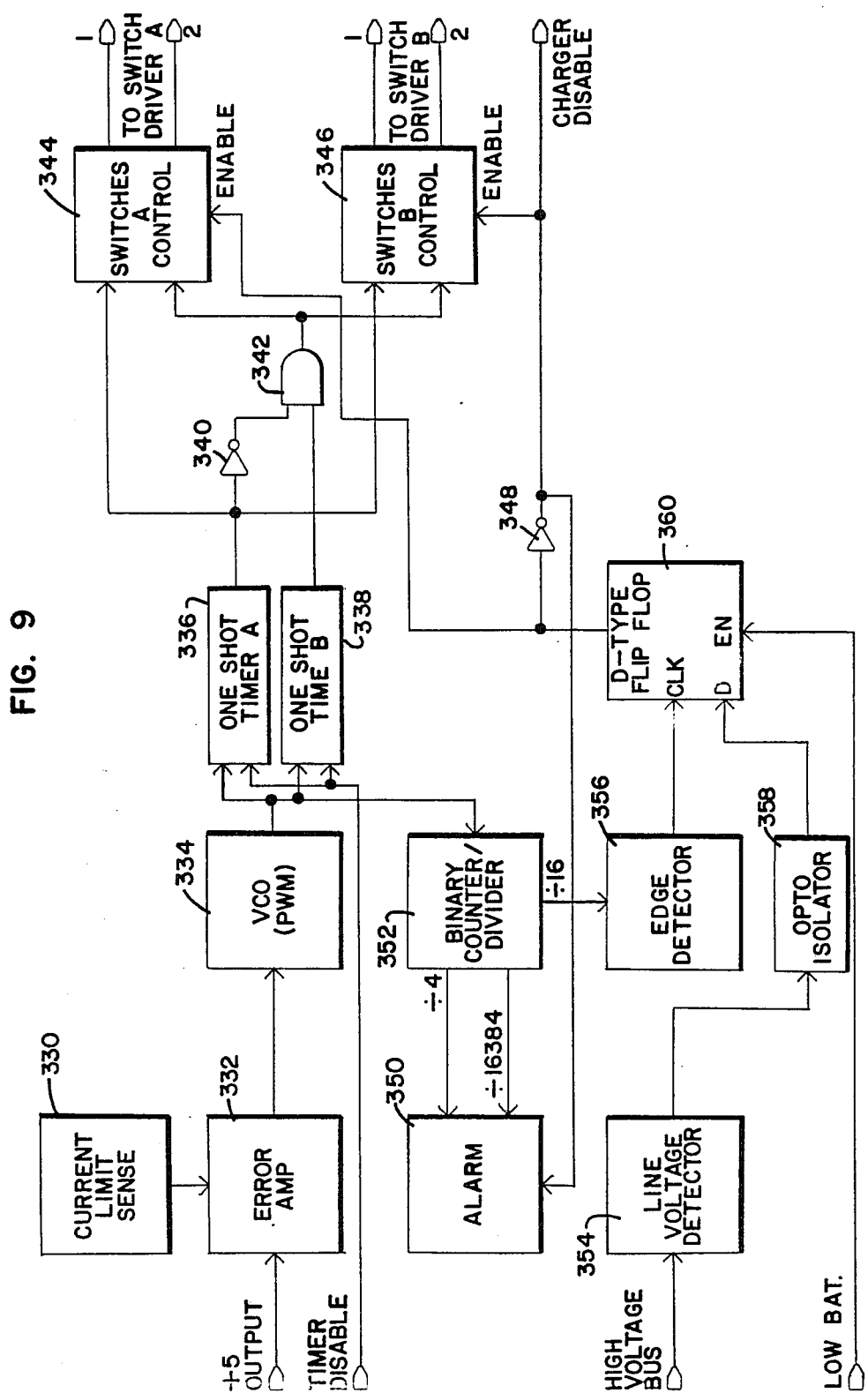
FIG. 9 is a low-level block diagram of the control circuit for the primaries of the DC/DC dual primary resonant converter circuit.
Figure 10A:
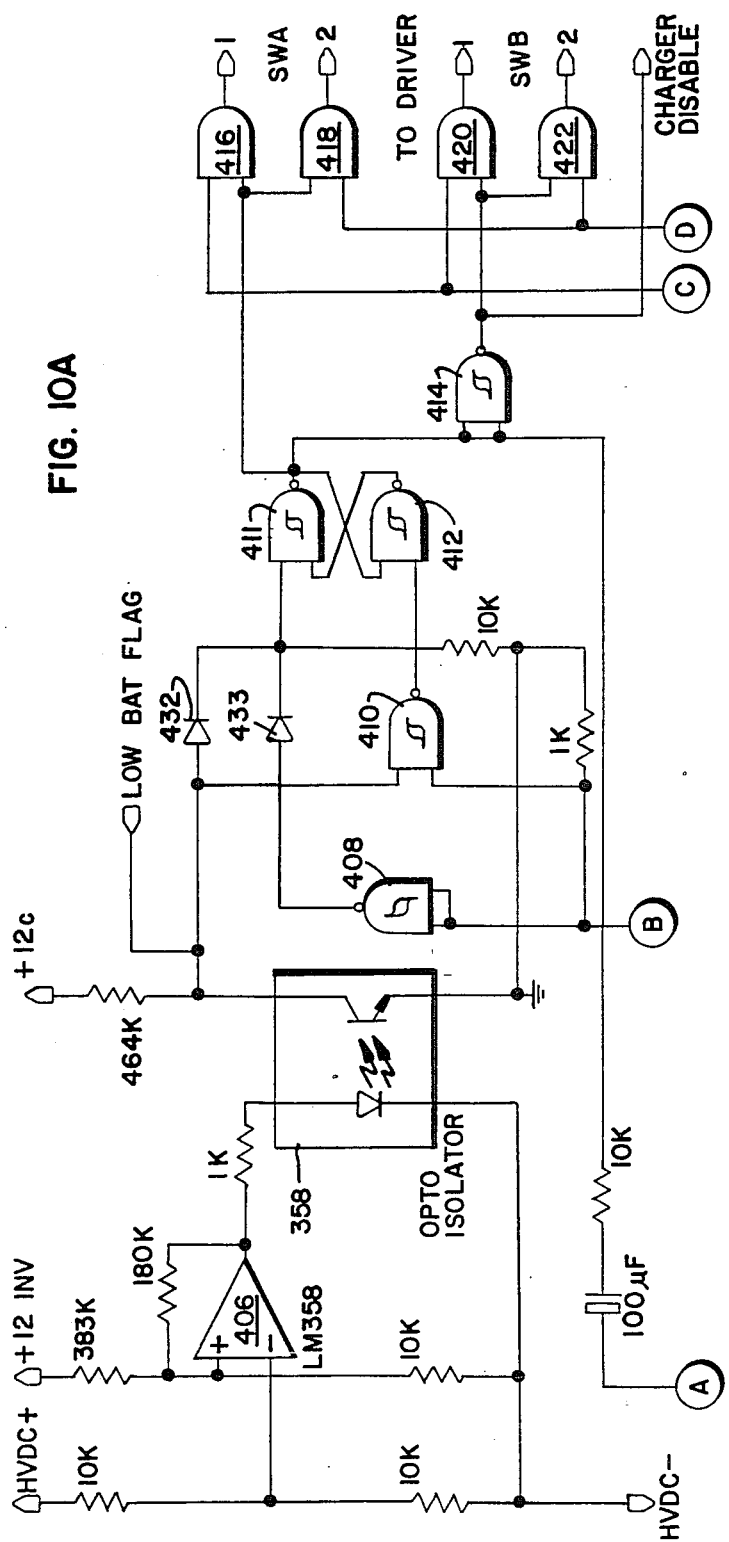
FIGS. 10A and 10B comprise a detailed electrical schematic diagrams of the primaries control circuit of the DC/DC dual primary resonant converter circuit.
Figure 10B:
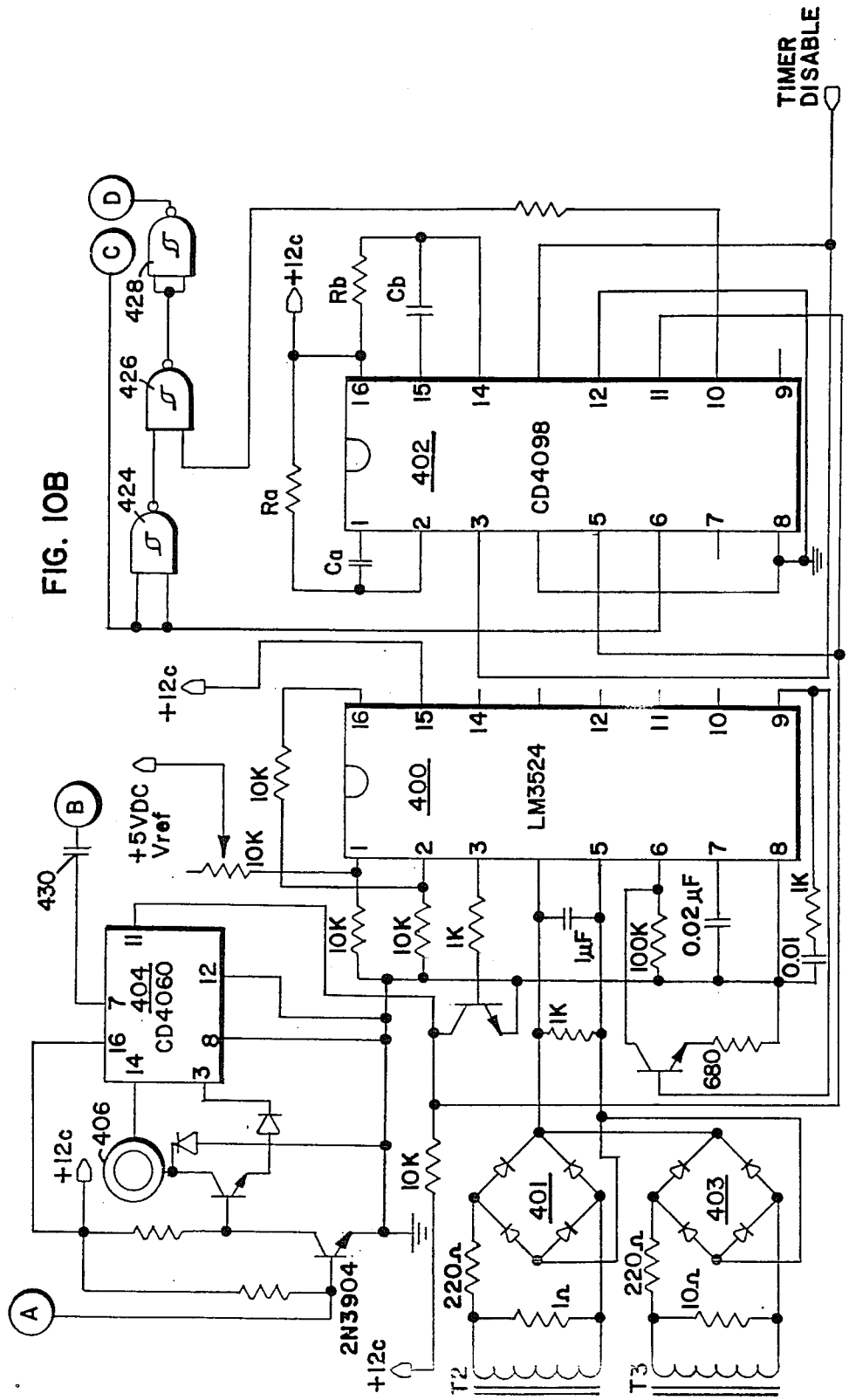

The control circuit for driving the main primary and auxiliary primary of the dual primary resonant converter circuit is shown in block diagram form in FIG. 9 and in detailed electrical schematic form in FIGS. 10A and 10B. The control circuit is designed to drive the primary circuit switches of the converter in such a way as to regulate the converter output voltages. The converter control circuit senses high voltage primary input voltage to control the converter switches so that power will be drawn from the high voltage primary only when sufficient HVDC input voltage is available. If insufficient high voltage primary input voltage is available, the control circuit will control the converter switches such that power will be drawn as needed from the low voltage DC input in order to maintain uninterrupted DC output voltages. The control circuit also provides an audible alarm to indicate that low voltage power is being used and also to provide the user with an indicator of battery state-of-charge. The control circuit also provides a means of limiting the converter current in case of output short circuit conditions. The control circuit is also designed to maintain galvanic isolation between the high voltage primary and the low voltage primary of the dual converter circuit 30.

Referring to FIG. 9, an off-the-shelf pulse width modulator (PWM) integrated circuit is used in a novel fashion as a voltage controlled oscillator (VCO) which is configured in such a way as to vary its clock frequency as a function of the error amplifier voltage 332. Although this is an unusual way of applying this particular PWM integrated circuit, it is a very cost-effective use of available technology. In the preferred embodiment of the present invention, the PWM integrated circuit is an LM2534 available from National Semiconductor and other second sources.

Error amplifier 332 (also internal to the LM3524) receives the +5VDC output from the low voltage secondary regulated supply shown in FIG. 7. Also attached to the error amplifier 332 is a current limit sense circuit 330 which is connected to the current sense windings T2 and T3 in the main primary and auxiliary primary, respectively, of FIG. 6. The current limit sense circuit senses when excessive currents are being drawn through the power transformer in a short circuit condition on one of the secondaries or other failure of the circuitry. The current limit sense circuit causes the error amplifier to shut down the VCO 334 to prevent damage under such failure conditions.

Under normal conditions, error amplifier 332 senses changing conditions on the +5VDC regulated output and sends an error signal to VCO 334 in response thereto. VCO 334 then increases or decreases its output frequency in response to the changing voltage conditions on the secondaries to correct for loading conditions and keeps the operating voltages within their tolerance limits.

The frequency output of VCO 334 is used to drive two one-shot timers 336, 338 implemented in the preferred embodiment with monostable multivibrators with fixed time interval outputs. One-shot timer A control 336 drives the enable gates for both switches A control 334 and switches B control B346 which in turn is used to drive the A1 and B1 switches respectively. A logic network comprised of inverter 340 and AND gate 342 controls the output of one-shot timer B 338 such that switches A2 and B2 operate only when the timer A 336 output is LOW and the timer B 338 output is HIGH, so that switches A1 and A2 or switches B1 and B2 cannot both be ON at the same time.

Another digital logic network comprised of inverter 348 and flip-flop 360 controls the enable lines to switches 344 and 346 as shown in FIG. 9. This logic network ensures that only the main primary switches A1 and A2 are operating while the auxiliary primary switches B1 and B2 are disabled during C mains operation of the IUPS. Also, the enable gates to switches 344 and 346 ensure that switches A1 and A2 of the main primary are disabled during battery backup mode and switches B1 and B2 are enabled for the auxiliary primary. In this fashion, the main primary and auxiliary primary cannot both be active at the same time.

The control of flip-flop 360 which in turn controls the enables to switches control 344 and 346 operates to detect when the HVDC bus drops below the requisite threshold voltage level indicating battery backup must be invoked. A line voltage detector circuit 354 monitors the HVDC bus and outputs a digital signal indicating when the HVDC bus drops below a preset threshold of, for example, 240V. Line voltage detector circuit 354 also contains hysteresis so that its output will not change unless the HVDC bus rises above a hysteresis preset threshold of, for example, 260V. In this fashion, flip-flop 360 is not caused to oscillate by line voltage detector 354 for small variations in the HVDC bus. The output from line voltage detector 354 is optically isolated from flip-flop 360 to provide galvanic isolation between the HVDC bus on the secondary of transformer 200 and the dual primary resonant converter control circuit of FIG. 9.

The operation of the switches A1 and A2 for primary A and the switches B1 and B2 for primary B of the dual primary resonant converter are synchronized in their operation as a result of the digital logic structure shown in FIG. 9. In a like fashion, the transfer of control from switches A to switches B and back again is synchronized with the operation of VCO 334 to ensure a smooth transition between AC mains supply of the IUPS and battery backup mode. This smooth transition is accomplished during zero current switching through the primaries of transformer 200 while switches A1, A2, B1 and B2 are all in an OFF state. This synchronization is accomplished through the clocking of flip-flop 360 being synchronized to the output of VCO 334 through binary counter 352 and edge detector 356. Binary counter 352 serves to divide the VCO output by 16, and edge detector circuit 356 serves to create a single pulse for every 16th output of VCO 334. This pulse then drives the clock input to flip-flop 360 which synchronizes the switch-over between switches A control 344 and switches B control 346. In this fashion, smooth transitions between voltage sources are provided which are completely transparent to the personal computer and the AC peripheral components attached to the AC output 140.

Binary counter divider circuit 352 also serves to drive a timed alarm enable circuit 350 which includes a piezoelectric sounder for indicating when battery backup mode has been invoked. The combined divided frequencies of the VCO divided by 4 combined with the VCO divided by 16,384 provide a pulsating alarm to alert the user that drain on the batteries is in progress. The timed alarm enable circuit 350 is driven by the same enabling signal line out of inverter 348 which invokes switches B control 346 to switch to battery backup mode on the dual primary resonant converter circuit. In this fashion, a loss of AC mains power is indicated to the user so that the user can take steps to preserve the program and data currently residing in volatile memory and perform an orderly shutdown before battery backup power is lost.

Since the alarm 350 is driven from the frequency output of VCO 334, the alarm pitch will vary depending upon the frequency of the VCO. In battery backup mode, when the battery voltage begins to sag and the batteries are nearing exhaustion, the pitch of the alarm 350 will increase as the VCO increases its switching frequency in order to compensate for the lower voltage on the auxiliary primary supplying the dual resonant converter circuit. This will provide a distinguishable audio indicator representative of the state of charge of the batteries.

Referring to FIGS. 10A and 10B, the detailed electrical schematic description of the control circuitry for the dual resonant primary converter circuit 30 is shown. PWM chip 400 is a commercially available LM3524 PWM controller available from National Semiconductor and other vendors which forms the heart of the VCO controller. This chip is used in an unconventional fashion to effect a VCO and not a PWM function. The error amplifier 332 and VCO 334 of FIG. 9 are both contained in the PWM chip 400. The clock output (pin 3) from the PWM chip 400 is used to drive two one-shot timers 336, 338 both contained in chip 402 which is, in the preferred embodiment, a dual monostable multivibrator chip CD4098 available from RCA Semiconductor and other vendors. The clock output of chip 400, pin 3, is produced from an internal oscillator which produces a frequency in proportion to the RC time constant set on pins 7 and 6. This time constant can be modified by an internal error amplifier, also included in chip 400, which operates in response to the 5VDC $V_{ref}$ connected to pin 1 of chip 400. In this fashion, chip 400 operates as a VCO. The details of the operation of the LM3524 pulse width modulator chip are described on pages 1-148 through 1-162 of the 1982 edition of the *National Semiconductor Linear Data Book*. The method of converting an LM3524 PWM chip into a VCO is described in the *Unitrode Power Supply Design Seminar Handbook SEM*-500, ©1986 by Unitrode Corp. of Lexington, Mass.

Another feature of the LM3524 PWM chip is an integral current limit sense amplifier having its inputs connected to pins 4 and 5 of chip 400 and its output wired with the output of the internal error amplifier. Overcurrent conditions sensed by this amplifier will cause the internal VCO to be shut down. This feature is used in the circuitry shown in FIG. 10B to sense overcurrent conditions on current sense transformer windings T2 and T3 for the drive circuits of the primary A and primary B driving circuits shown in FIG. 6. The secondaries of the current sense transformers T2 and T3 shown in FIG. 10B receive a voltage proportional to the current through the primaries, rectify this voltage through full-wave bridge rectifiers 401 and 403, and apply the resultant proportional voltages to pins 4 and 5 of chip 400. Hence, an overcurrent condition on current sense transformers T2 and T3 results in an oversense current potential placed between pins 4 and 5 which are internally connected to the current limit amplifier, which in turn will cause the VCO to shut down during this overcurrent condition.

The VCO output drives the dual monostable multivibrator 402 on pins 5 and 11 and also pin 11 of a 14-bit binary counter and oscillator chip CD4060 available from RCA Semiconductor and other vendors. Pin 11 of chip 404 is the clock input to a 14-bit binary counter of which bit 14 of the counter (corresponding to the divide-by-16,384 output) and pin 3 (corresponding to the divide-by-4 output) both drive the control circuit for piezoelectric sounder 406. These two outputs, when combined for controlling piezoelectric sounder 406, produce a pulsating tone which is activated by the signal line from the output of Schmitt trigger 411 (described below).

Output pin 7 of counter chip 404 (corresponding to the divide-by-16 output) drives through capacitor 430 which functions as an edge detector 356 as shown in FIG. 9. This edge detector creates a single pulse output each time pin 7 of chip 404 changes state. The output of the edge detector capacitor 430 drives the clock input of a D-type flip-flop comprised of Schmitt triggers 408, 410, 411 and 412 along with various associated resistors and capacitors as shown in FIG. 10A. It will be appreciated by those skilled in the art that the discrete components comprising the D-type flip-flop could quite easily be replaced by a single monolithic D-type flip-flop chip. The data input to the D-type flip-flop of FIG. 10A drives the anode of diode 432 which receives its signal from the collector of the receiving transistor of opto-isolator 358. This data input is used to detect through opto-isolator 358 when the line voltage on the HVDC drops below an acceptable threshold level. In this condition, the D-type flip-flop changes its output state on the output of Schmitt trigger 411 as synchronized and clocked by the divide-by-16 output of binary counter chip 404. The output from Schmitt trigger 411 corresponds to the noninverting output of the D-type flip-flop which is used to drive one side of AND gates 416 and 418 which serve as the trigger signals for switches SWA1 and SWA2 of the primary A of power transformer 200, as shown in FIG. 6. The noninverting output of the D-type flip-flop from Schmitt trigger 411 also drives the input to Schmitt trigger gate 414 which serves as an inverter to create the inverting output of the D-type flip-flop. This logical output drives one side of gates 420 and 422 which in turn serve as the triggering gates for switches SWB1 and SWB2 driving the auxiliary primary or primary B of the power transformer circuit shown in FIG. 6. In this fashion, the output of the D-type flip-flop as implemented in the preferred embodiment using discrete gates and components serves to enable or disable the switches.

The actual switching control lines come from the two monostable multivibrators from chip 402. Monostable A (output pin 6) drives the SWA1 and SWB1 gates 416 and 420 respectively to control the switching frequency and pulse or ON time duration of those gates. The monostable multivibrator B (output pin 10) drives the input to Schmitt trigger 426 which is enabled by the inverted output of the A monostable multivibrator (pin 6). In this fashion, the B monostable multivibrator cannot enable the B switches while the A monostable multivibrator is ON. This ensures mutual exclusivity between either the A1, A2 switches or the B1, B2 switches. The output of Schmitt trigger gate 426 is inverted by gate 428, which is then used to drive the SWA2 and SWB2 driving gates 418 and 422 respectively. These drive the B switches of the main or auxiliary primaries of power transformer 200.

Control Circuit Power Supply

Referring once again briefly to FIG. 2, the control circuit power supply (CCPS) module 510 is used to provide the +12VDC supply voltage used to run the control module 508 and other distributed control functions throughout the IUPS. The CCPS also operates in conjunction with the overvoltage/undervoltage (OV-/UV) shutdown circuit 524 to indicate when a fault has occurred on any one of the low voltage outputs driving the computer. In that condition, the OVP shutdown flag will indicate to the CCPS module 510 that a fault has occurred and that the system should be halted. The OV/UV shutdown module 524 also produces a POWER GOOD flag which indicates when all low voltage outputs are within their tolerance limits. This POWER GOOD flag is used by many models of computers to enable the microprocessor to begin processing a short time after initial turn-on.

The CCPS module receives battery voltage from the battery pack 100 and +12VDC from the +12VDC output from the 12V regulator module 518. In normal operation, the CCPS module uses the +12VDC output to produce the +12C output for driving the control module. Upon cold start from battery backup, the CCPS module uses the battery voltage from battery pack 100 to produce the +12C supply (which in normal operation is +12VDC, and in battery backup operation is approximately +11VDC).

The CCPS module also senses the battery voltage to produce the low battery flag to the control module to provide a complete shutdown of the unit when the AC mains have failed and the battery pack has been exhausted below a viable operating threshold. The control module 508 receives these signals and uses them to appropriately control the IUPS. The control module senses the high voltage secondary and determines when battery backup is required. During normal operation when the HVDC bus is at a sufficiently high voltage, battery charger 80 is enabled by the control module 508. When the HVDC bus drops below its acceptable operating voltage from the AC mains, battery backup is enabled and the control module 508 disables the battery charger 80 to preserve operating efficiency during battery backup operation.

Figure 11:
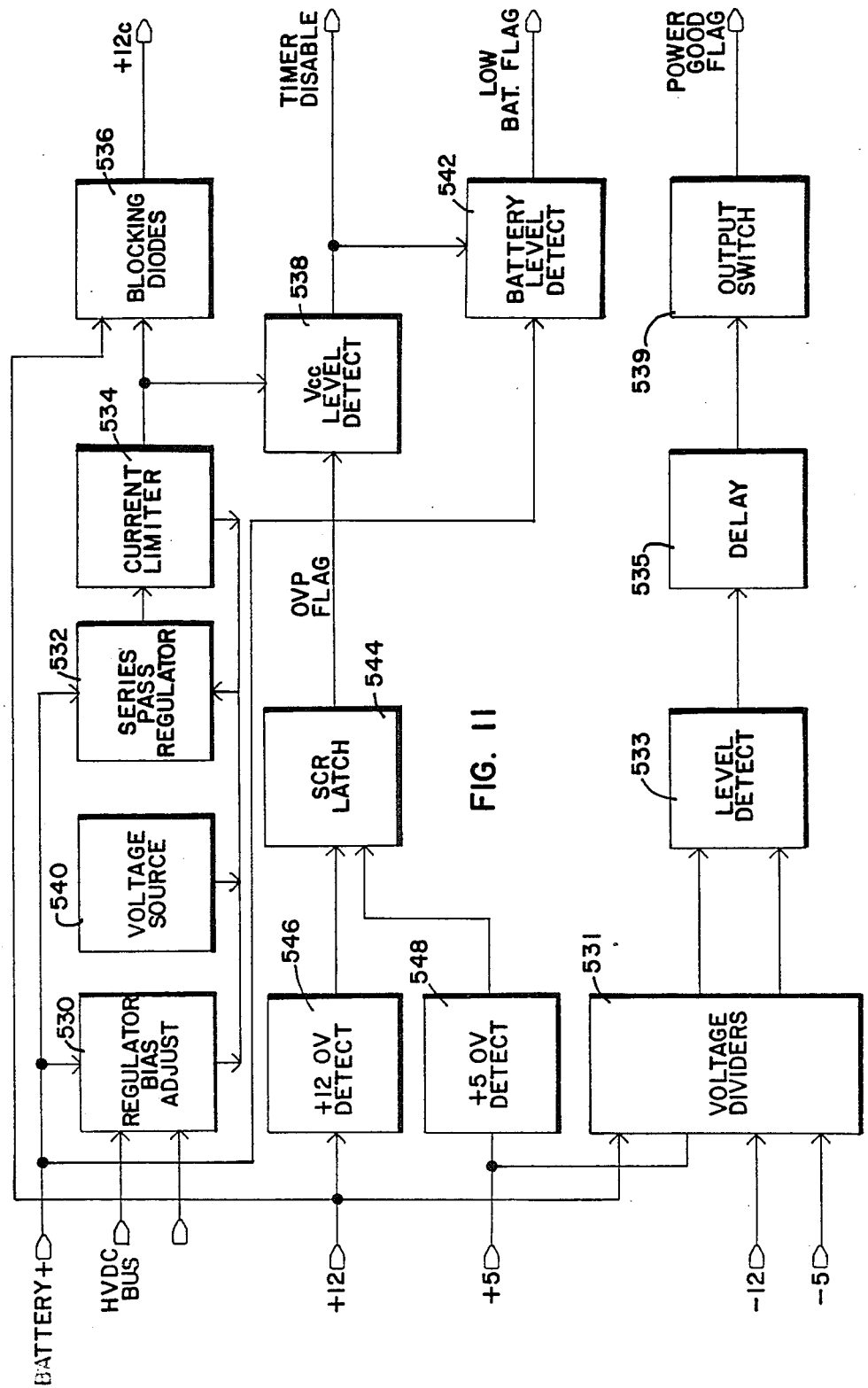
FIG. 11 is a low-level block diagram of the control circuit power supply and overvoltage/under-voltage shutdown circuits for the preferred embodiment of the present invention.
Figure 12:
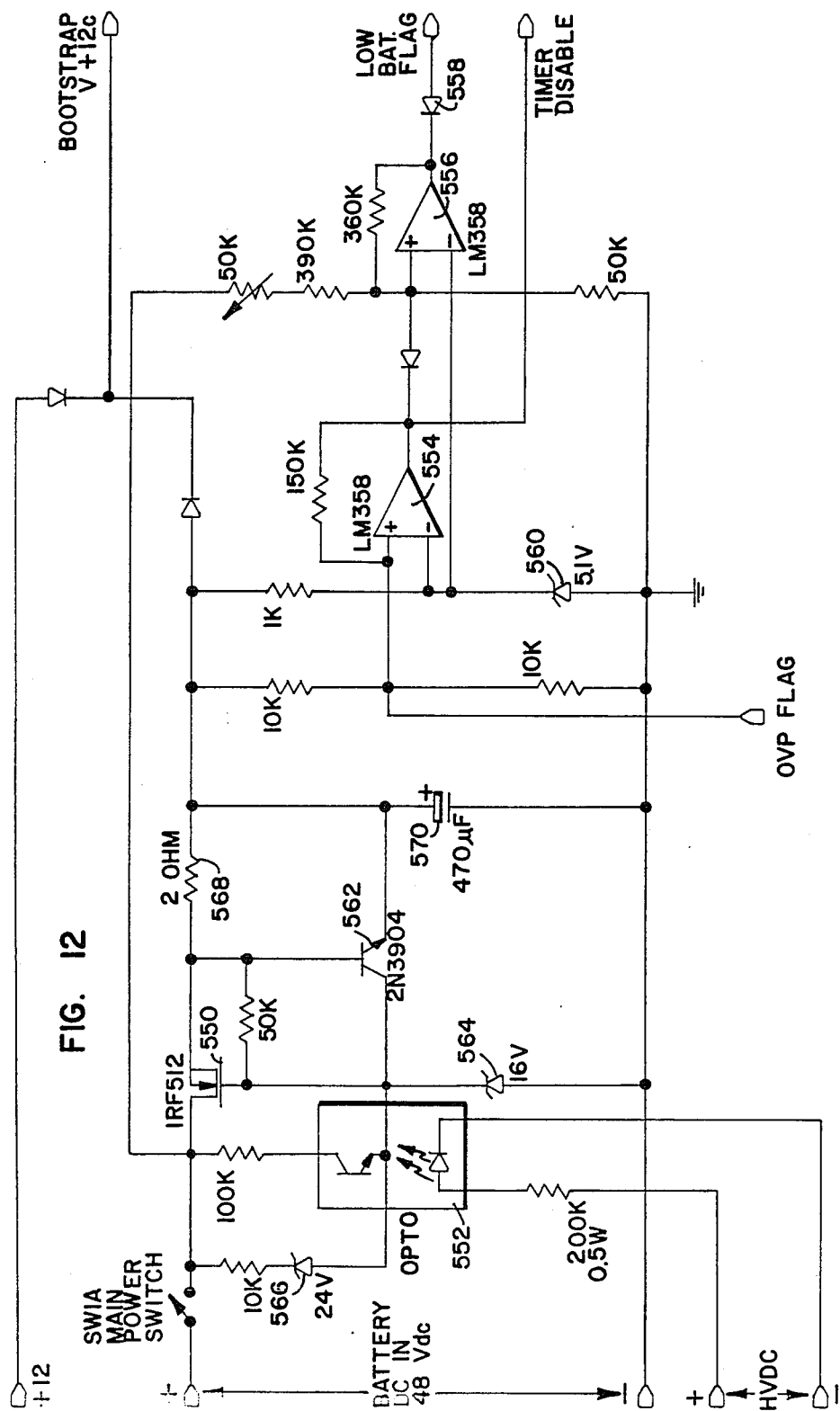
FIG. 12 is a detailed electrical schematic diagram of the control circuit power supply (CCPS) module.

A block diagram describing the CCPS module 520 and the OV/US shutdown module 524 is shown in FIG. 11. The purpose of the CCPS module is to provide a supply voltage of approximately 12VDC to supply the various control circuits of the IUPS. The 12VDC on the +12C line shown in FIG. 12 is derived from either the battery voltage or from the +12VDC output to the computer supply. Whether operating in battery backup mode or off of AC mains, the IUPS will normally receive its operating voltage on the +12C line from the +12VDC LVDC output of the dual DC/DC converter circuit. The +12VDC is isolated from the voltage produced by the CCPS by blocking diode 536. Thus, in normal operation the +12C line has 12VDC supplying the control circuitry.

Upon cold start, the +12C supply line receives approximately 11VDC from the CCPS through blocking diode 536. The battery voltage is used to produce this bootstrap voltage to get the IUPS up and running before the AC lines or the battery backup can be invoked to begin producing LVDC outputs. The battery voltage, which is nominally 48VDC, is regulated by series pass regulator 532 to produce the approximately 11VDC through current limiter 534 to drive blocking diode 536. The regulator bias adjust circuitry 530 prevents the IUPS from initiating a cold start from battery backup when the batteries are in a discharge state and the battery voltage is below 30VDC. Since the batteries in such a weakened condition cannot supply sufficient voltage and current to drive the IUPS, regulator bias adjust circuit 530 prevents a cold start from battery backup. However, even with the batteries in a weakened state, if the IUPS is started off AC mains, the HVDC bus will be the first to power up, causing regulator bias adjust 530 to allow battery voltage to be used through series pass regulator 532 to produce a bootstrap voltage on the +12C output of approximately 11VDC in order to cold start the IUPS. Once the IUPS is operating, the LVDC outputs will produce sufficient +12VDC to drive through blocking diode 536 a +12VDC supply on the +12C line.

Voltage source 540 is used to set the battery threshold startup voltage for cold start from battery backup and cold start from the AC mains.

The overvoltage/undervoltage detect circuitry is also shown in block diagram form in FIG. 11. Overvoltage is only detected on the +12VDC and +5VDC lines, as shown in blocks 546 and 548. An SCR latch 544 is used to latch an overvoltage condition and produce an overvoltage protection flag. The OVP flag can only be cleared by a complete shutdown of the IUPS. The OVP flag drives the $V_{CC}$ level detect circuitry 538 which produces a timer disable signal for disabling the monostable multivibrator timers 336 and 338 shown in FIG. 9, and contained in chip 402 shown in FIG. 10B. The $V_{CC}$ level detect also senses the voltage level on the output of current limiter 534 to determine whether a cold start from battery backup is possible. In either low battery or overvoltage conditions, the timer disable signal will be produced, preventing the DC/DC dual primary converter from operating.

A low battery level detect circuit 542 is also triggered from the output of the $V_{CC}$ level detect and the battery voltage to produce a low battery flag upon near exhaustion of the batteries. The low battery flag serves to disable the clocking of the switches A control and switches B control through D-type flip-flop 360 shown in FIG. 9. The low battery flag is shown in detail driving the enable input of the D-type flip-flop shown in FIG. 10A.

The voltage divider circuit 531 senses and compares the voltage conditions on the ±12VDC and ±5VDC LVDC bus output to the computer. The level detect circuit 533 senses when supply voltages have deviated from their appropriate levels. This out-of-range signal from circuit 533 is delayed an appropriate amount of time by delay 535 such that output switch 539 produces a POWER GOOD flag only after the power supply is allowed a settling time. The POWER GOOD flag is used to indicate to certain types of personal computers when the supply voltages have reached and stablized at their appropriate levels. The POWER GOOD is then used by the central processor of the personal computer to begin operation and to stop operation if the supply voltages go awry.

The detailed electrical schematic diagram describing the CCPS is shown in FIG. 12. Main power switch SW1A is ganged with the other half of the main power switch SW1B shown in FIG. 4. Switch SW1A controls the application of the 48VDC battery voltage to the CCPS. MOSFET transistor 550 is used to gate the current through the series pass regulator circuit. The gate of MOSFET transistor 550 can be turned ON in one of two ways. If the battery level is above 40VDC, current will flow through zener diode 566 and zener diode 564, creating a bias voltage of approximately 16VDC on the gate of MOSFET transistor 550, biasing it ON. The second method of biasing transistor 550 ON is for high voltage to be applied to the HVDC bus, which will send a signal through optical coupler 552 which will also gate transistor 550 ON in the presence of minimal battery voltage (approximately 20VDC). Thus, in a cold start operation from AC mains, any battery voltage at all will flow through transistor 550 to provide the bootstrap startup voltage on the +12C output. In a cold start from battery backup, at least 40VDC is required on the battery to make transistor 550 conduct and thereby to provide a cold startup. If the main power switch is left ON while in battery backup mode and the battery voltage sags below 35VDC, transistor 550 will be shut OFF, since insufficient bias current will be passing through zener diode 556. In this condition, the batteries are not allowed to be discharged below 35VDC, and the only drain on the batteries is the leakage current through back-biased zeners 556 and 554.

The series pass regulator is constructed in a conventional fashion using pass transistor 550, bias level transistor 562, the 50K resistor between the gate of transistor 550 and the base of transistor 562. The voltage is regulated by zener diode 564 and is filtered by filter capacitor 570. The 2-ohm resistor 568 serves as an overcurrent sense circuit which serves to shut down the series pass regulator upon excess current draw through the resistor.

The timer disable flag of FIG. 12 is derived by comparing the series pass regulated supply voltage to a reference voltage. In the preferred embodiment of the present invention, a 5.1V zener 560 is used to set the reference threshold of comparator 554, which in the preferred embodiment is an LM358 available from National Semiconductor and other vendors. The reference threshold is compared to the center resistive divider network attached to the non-inverting input of comparator 554 shown in FIG. 12 such that a supply voltage below 10VDC will cause a timer disable flag to be set to shut down the control circuitry for the DC/DC dual primary resonant converter.

Comparator 556 is used to determine a low battery condition. The inverting input to comparator 556 also uses the 5.1V zener 560 as a reference voltage to determine when the battery voltage drops below 30VDC. The variable 50K resistor on the resistive divider network attached to the non-inverting input to comparator 556 allows "fine tuning" of the voltage threshold. The low battery flag is then used to disable the control circuitry driving the dual primary resonant converter circuits. The purpose of the low battery flag is to shut down an already operating IUPS when it is operating in battery backup mode. Since the HVDC bus will be supplied by the high voltage secondary of the DC/DC dual primary resonant converter circuit, opto-isolator 552 will keep pass transistor 550 biased ON regardless of the battery voltage. Hence, without a low battery flag, the IUPS in battery backup mode will completely exhaust the batteries. Once the low battery flag shuts down the DC/DC dual primary resonant converter, the opto-isolator will remove the bias voltage from the gate of transistor 550 and zener diode 556 will inhibit transistor 550 from turning ON until AC mains is restored.

Figure 13:
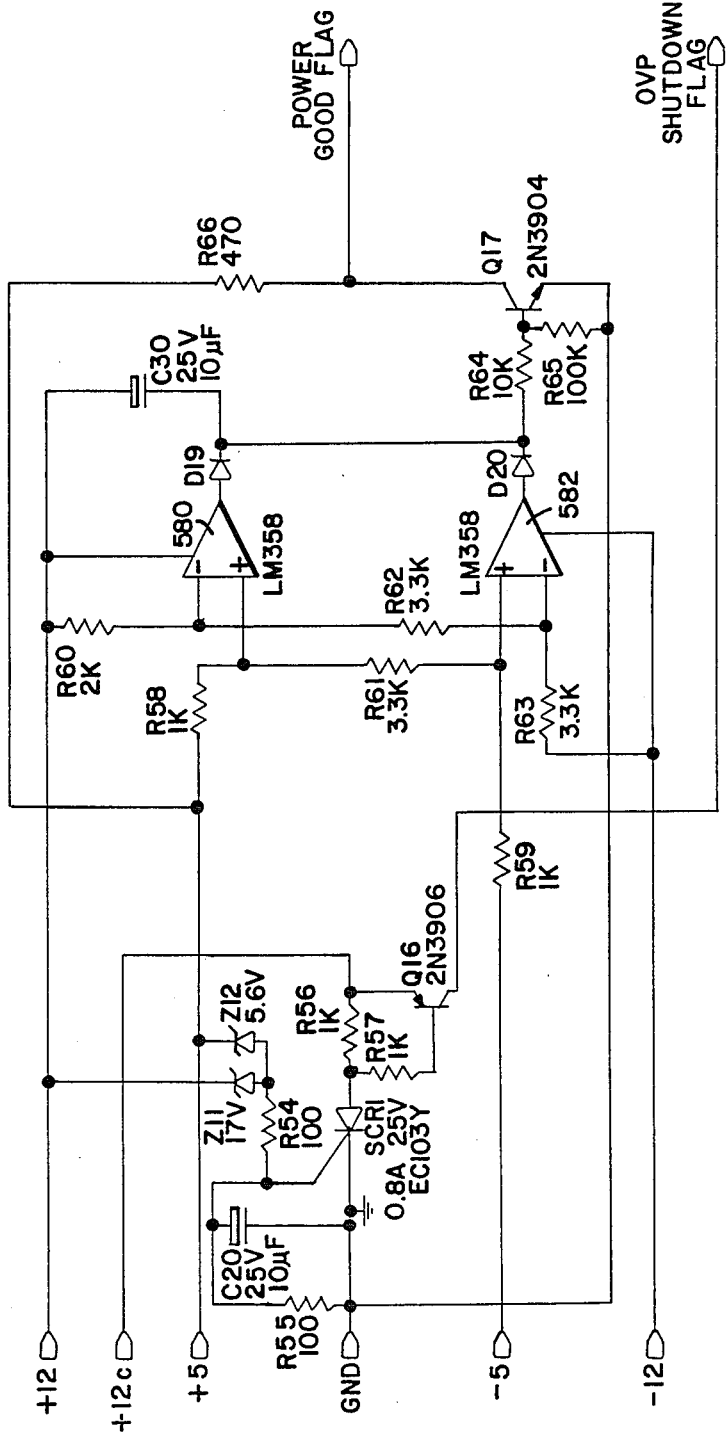
FIG. 13 is a detailed electrical schematic diagram of the overvoltage/undervoltage shutdown circuits.

An overvoltage protection (OVP) flag also drives the noninverting input of comparator 554 to serve to shut down the control circuit for the DC/DC dual primary resonant converter when an overvoltage condition exists on the LVDC outputs. The source of the OVP flag is shown in FIG. 13.

Overvoltage on the +12VDC and +5VDC lines are sensed by zener diodes Z11 and Z12 respectively. An overvoltage condition on either of these lines will cause the reverse breakdown of zener diode Z11 or Z12, which in turn cuases the trigger line of SCR1 to fire SCR1. Those skilled in the art will recognize that once current begins flowing through SCR1, the SCR will remain ON until the current is interrupted regardless of the level on the trigger input. This causes the SCR to latch. This SCR latching circuit includes capacitor C20, which in the preferred embodiment is a 25V 10-microfarad capacitor which is charged by the reverse breakdown current of either zener diode Z11 or Z12. Capacitor C20 will charge and keep the trigger control line of SCR1 inactive for approximately one millisecond as determined by the RC time constant of R55 and C20 as a time delay to turn-on of SCR1.

The firing and latching of SCR1 causes transistor Q16 to be biased ON, producing the OVP shutdown flag which is used to drive the control circuitry of FIG. 12 to produce the timer disable flag, effectively disabling the control circuitry for the DC/DC dual primary resonant converter circuits.

A POWER GOOD flag is generated only if the ±12VDC and ±5VDC LVDC outputs of the IUPS are within their specified ranges. The ±12VDC lines are divided by the voltage divider ladder of resistors R60, R62 and R63 and the resultant voltages are driven into the inverting inputs to comparators 580 and 582 which, in the preferred embodiment, are LM358 comparators available from National Semiconductor and other vendors. The ±5VDC lines are divided by a resistive divider network comprised of resistors R59, R61, R58 and applied to the noninverting inputs to comparators 580 and 582. Thus, by placing the ±12VDC and ±5VDC lines between resistive divider networks and driving common comparators, any out-of-range voltages on the aforesaid lines will cause one of the comparator outputs to go HIGH, which would cause transistor Q17 to ground the POWER GOOD flag. Since the POWER GOOD flag is a HIGH active signal, it must be at the TTL +5V level to indicate that all voltages are within their specified ranges. Thus, the aforesaid circuit compactly and efficiently determines when one of the four LVDC lines is out of range. Since it is extremely unlikely that two of the LVDC lines will track out of range together, the circuit shown in FIG. 13 will indicate any one voltage line being out of range.

Capacitor C30 provides an approximately onesecond delay for the POWER GOOD flag upon initial power-up. Thus, after the LVDC lines have stabilized, the POWER GOOD flag will remain LOW for approximately one second before indicating to the CPU of the personal computer that all lines are within the operating ranges.

DC-to-AC Inverter Module

Figure 14:
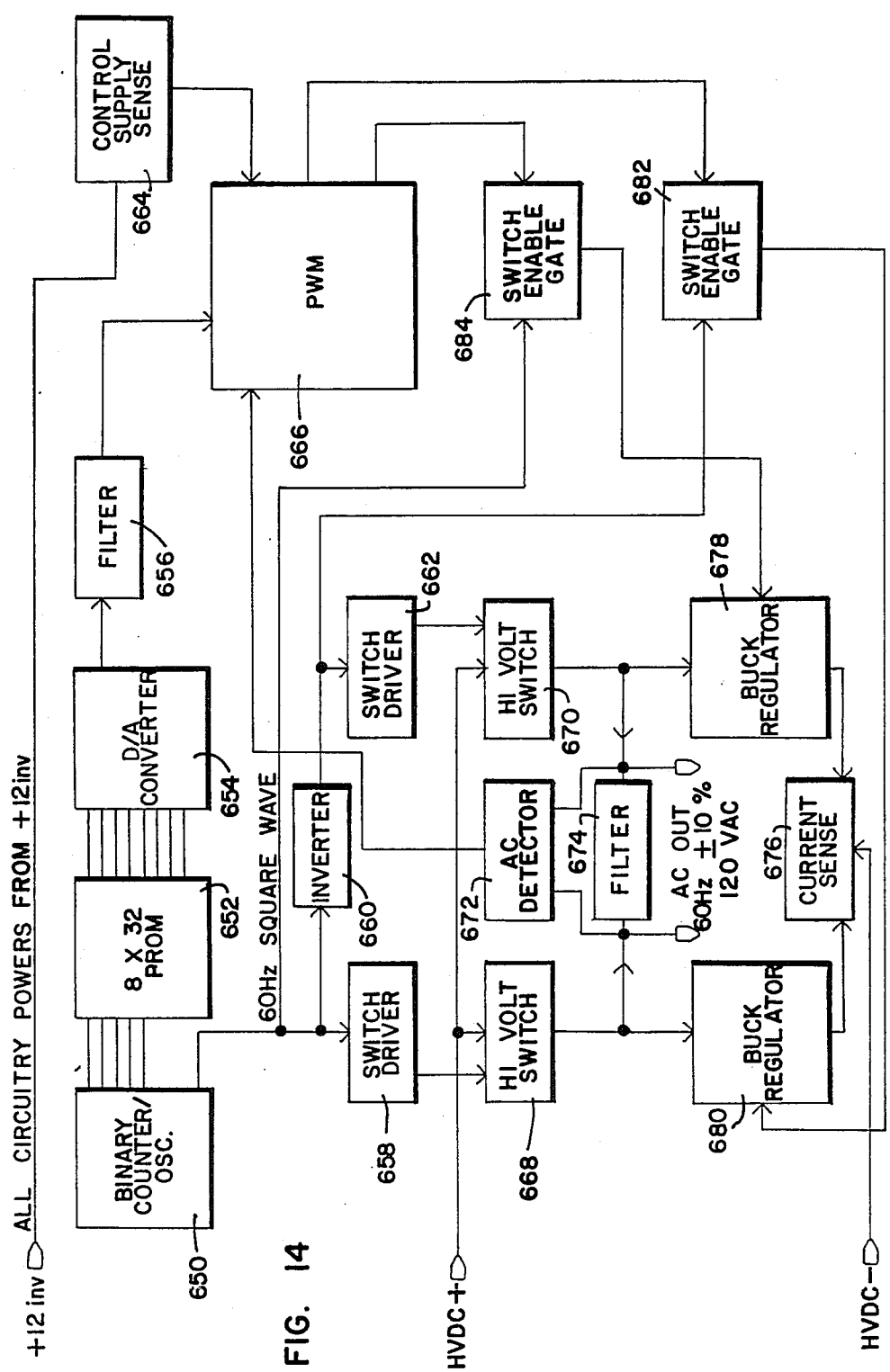
FIG. 14 is a low-level block diagram of the DC/AC inverter module of the preferred embodiment of the present invention.

The DC-to-AC Inverter Module 40 of FIG. 1 is described in block diagram form in FIG. 14. The inverter power circuitry is shown in detailed electrical schematic diagrams in FIG. 15, and the inverter control circuitry is shown in detailed electrical schematic diagrams of FIGS. 16A, 16B and 16C. The inverter control module receives high voltage DC off the HVDC bus and switches it using a dual buck regulator circuit into a smooth 120VAC 60 Hz ±10% output in the preferred embodiment. Those skilled in the art will recognize that the present preferred embodiment is adaptable to supplying a wide variety of AC voltages and frequencies.

The DC/AC inverter module also receives a 12VDC supply labeled +12 INV, which is a galvanically isolated power source derived from a separate inverter supply secondary shown in FIG. 8. All of the control circuitry is powered off the +12 INV supply.

Referring to FIG. 14, the HVDC bus is switched by two mutually exclusive high voltage switches 668 and 670 and by two mutually exclusive buck regulators 678 and 680, respectively. The switches are controlled by switch drivers 658 and 662 respectively to ensure that only one of the switches is ON at any given time. The high voltage switches allow current to flow through one of the two buck regulators 680 or 678, depending on which one is enabled at that time, between +HVDC and −HVDC. Current sense circuit 676 completes the circuit between the buck regulators and the −HVDC bus.

Buck regulators 678 and 680 are enabled by switch enable gates 684 and 682 respectively, which in turn conduct control pulses from a pulse width modulator (PWM) chip 666. The switch enable gates operate mutually exclusively such that when switch enable gate 684 is ON, switch enable gate 682 is OFF. Switch driver 658 and switch enable gate 684 are driven directly by a 60 Hz square wave generated by binary counter/oscillator 650. The inverted version of this 60 Hz square wave inverted by inverter 660 is used to drive switch driver 662 and switch enable gate 682. Thus, the high voltage switches 668 and 670 are pulsed in synchrony with buck regulators 678 and 680, respectively, at approximately 60 Hz derived from binary counter 650. The output from the PWM modulator chip is used to control the magnitude of the voltage level on the AC output of the inverter module.

The pulse width modulator 666 controls the voltage on the AC output by detecting the level of voltage on AC detector 672 which feeds back this level to PWM 666, which then adjusts the width of the driving pulse train accordingly. This driving pulse train is sent through switch enable gates 684 and 682 when the respective gates are ON during the 60HZ square wave to control the buck regulators 678 and 680 respectively. The buck regulators contain MOSFET switches which ground the regulators when the outputs of the switch enable gates are HIGH. The PWM chip 666 operates at a nominal frequency of approximately 100 KHz. The width of the pulses varies according to the output voltage across the AC output. Thus, although each switch driver 658 or 662 is open only for 1/120 of a second, depending upon which polarity of the sine wave is being generated, the buck regulators are switching at a much higher frequency with control pulses that vary in width according to the voltage point along the half-sine wave pulse being generated at the moment.

PWM chip 666 receives a second feedback signal which determines the voltage level along the sine wave that is being generated on the AC output. Binary counter 650 drives an 8×32 PROM 652 at a frequency selected to address all 32 locations within 1/120 of a second. This 8×32 PROM contains a digitized representation of a quasi-sinusoidal or half-sine pulse which is presented to digital-to-analog (D/A) converter 654. The output of D/A converter 654 is a summed voltage representative of a relative voltage level on a half-sine pulse which is filtered by filter 656 before being driven into pulse width modulator 666. This reference half-sine pulse is then used to control the width of pulses which drive the buck regulators to determine the eventual output voltage on the AC output of the inverter module. Thus, the waveshape of the 60 Hz AC output from the inverter module is digitally controlled from a sine wave reference oscillator (SRO) constructed from binary counter 650, 8×32 PROM 652, and D/A converter 654. This results in a very clean 60 Hz output which does not vary with loading conditions.

Those skilled in the art will readily recognize that the PROM (or ROM, RAM, EPROM, EEPROM, etc.) may contain a full sine-wave, or other quasi-sinusoidal or nonsinusoidal waveshapes.

Figure 15:
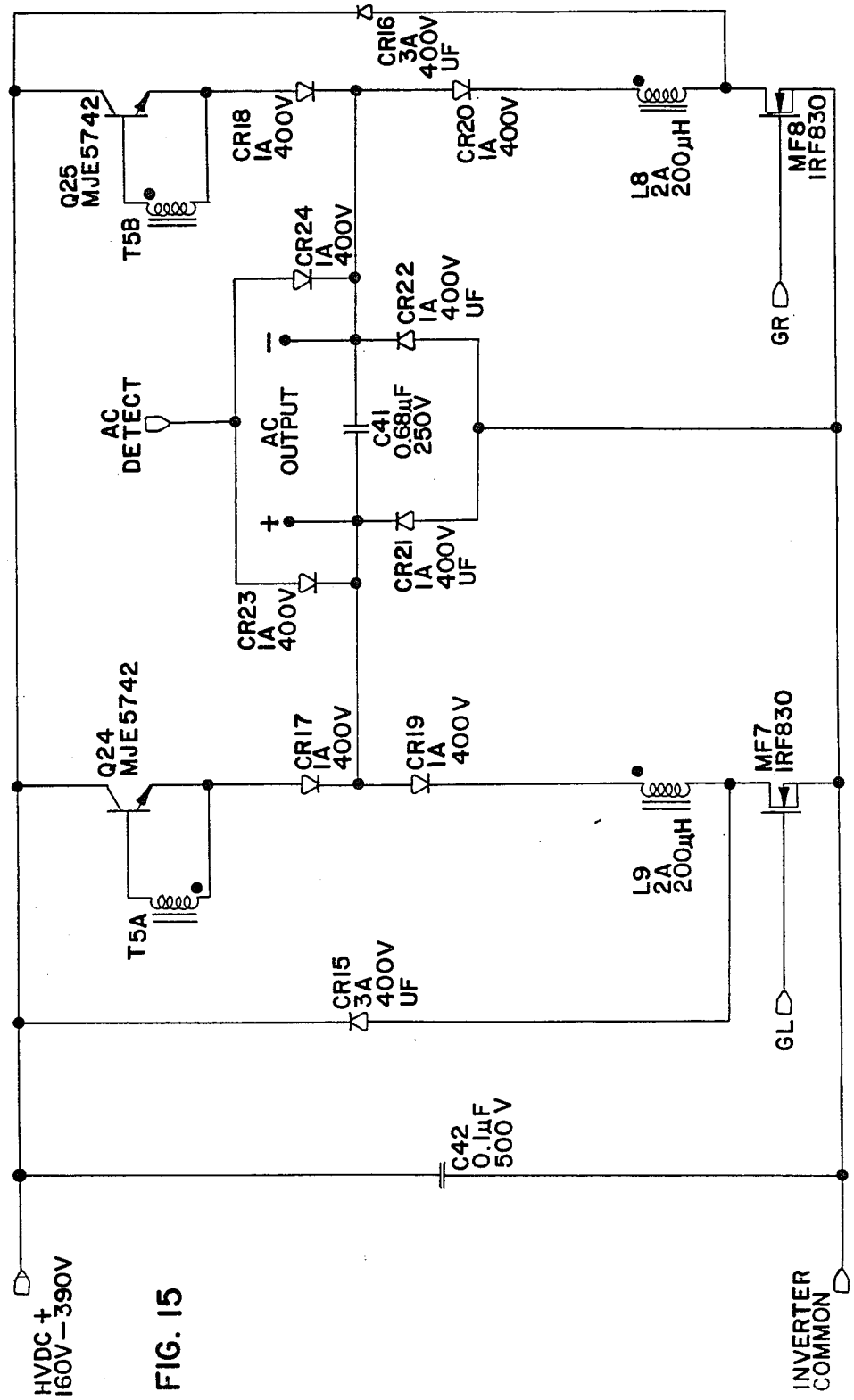
FIG. 15 is a detailed electrical schematic diagram of the power circuit of the DC/AC inverter module.

FIG. 15 shows the bridge circuit of the inverter power control circuitry. This circuit operates to switch the high voltage from the HVDC bus across the AC output in an H-bridge configuration. For a positive half-sine pulse across the AC output, bipolar transistor Q24 is turned ON and MOSFET MF8 is turned ON, forming a current path from HVDC+ to HVDC− through the AC output. At this time during the positive-going half-sine pulse, bipolar transistor Q25 and MOSFET transistor MF7 are both OFF. Inductor L8 and MOSFET MF8 serve as a buck regulator to inhibit the amount of current flowing through the aforementioned current path and hence limit the voltage on the AC output. During the positive-going half-sine pulse, MOSFET transistor MF8 is pulse width modulated through control line GR to regulate the voltage across the AC output. During the entire half-sine pulse in which transistor MF8 is pulse width modulating buck inductor L8, bipolar transistor Q24 is held ON.

For the negative half-sine wave produced on the AC output, bipolar transistor Q25 is held ON for 1/120 of a second while MOSFET transistor MF7 is pulse width modulated through control line GL to form a current path from HVDC− to HVDC+, creating a negative half-sine pulse across the AC output. Then, a buck regulator comprised of inductor L9 and MOSFET MF7 operate to control the voltage across the AC output.

Bipolar transistors Q24 and Q25 are switched symmetrically by 60-cycle transformers T5A and T5B respectively. The control of these transistors is such that one is always ON while the other is OFF, and neither are both ON or both OFF at the same time. Those skilled in the art, however, will recognize that other variations on the ON times and OFF times of transistors Q24 and Q25 may be incorporated into the preferred embodiment of the present invention without varying from the spirit and scope of the invention. In the preferred embodiment, bipolar transistors Q24 and Q25 are part numbers MJE5742 power transistors available from Motorola Semiconductor and other vendors.

In operation, during a positive half-sine pulse, bipolar transistor Q24 and MOSFET transistor MF8 are turned ON, allowing current to pass from the HVDC+ line of the high voltage bus through transistor Q24, through diode CR17, through the load attached to the AC output, through diode CR20, through inductor L8, and through MOSFET transistor MF8 to the common or return line labeled Inverter Common. Once this current path is established, the current begins to ramp up at inductor L8. Upon the opening of MOSFET transistor MF8 by control line GR, the flyback current released from inductor L8 is conducted back up through diode CR16 to the +HVDC bus.

In a like fashion, in operation the negative half-sine pulse is regulated by supplying charging current to inductor L9 and releasing the flyback current through diode CR15. Thus, a dual buck converter is constructed to provide a regulated AC output.

Clamping diodes CR15 and CR16 are in the preferred embodiment 3-amp, 400V ultra-fast diodes which serve to limit the transient voltages which appear across the switching MOSFETs MF7 and MF8 respectively. MOSFET switches MF7 and MF8 are in the preferred embodiment IRF830 power MOSFETs available from International Rectifier and other vendors.

The maximum voltage ratings of bipolar transistors Q24 and Q25 need only be selected to be slightly greater than the maximum AC output voltage. This is due to the fact that the maximum voltage across the collector-emitter junction of bipolar transistors Q24 and Q25 is limited to the AC output voltage, since when one of the respective transistors is OFF, the opposite side transistor is ON, limiting the collector-emitter voltage of the OFF transistor to that of the AC output. For example, when transistor Q24 is OFF, transistor Q25 is ON, with respect to the HVDC+ bus line, the −AC output is effectively at ground, placing the maximum AC output voltage across Q24. Thus, bipolar transistors Q24 and Q25 can be selected in the preferred embodiment to be medium speed switching, medium voltage transistors of a common variety.

Figure 16A:
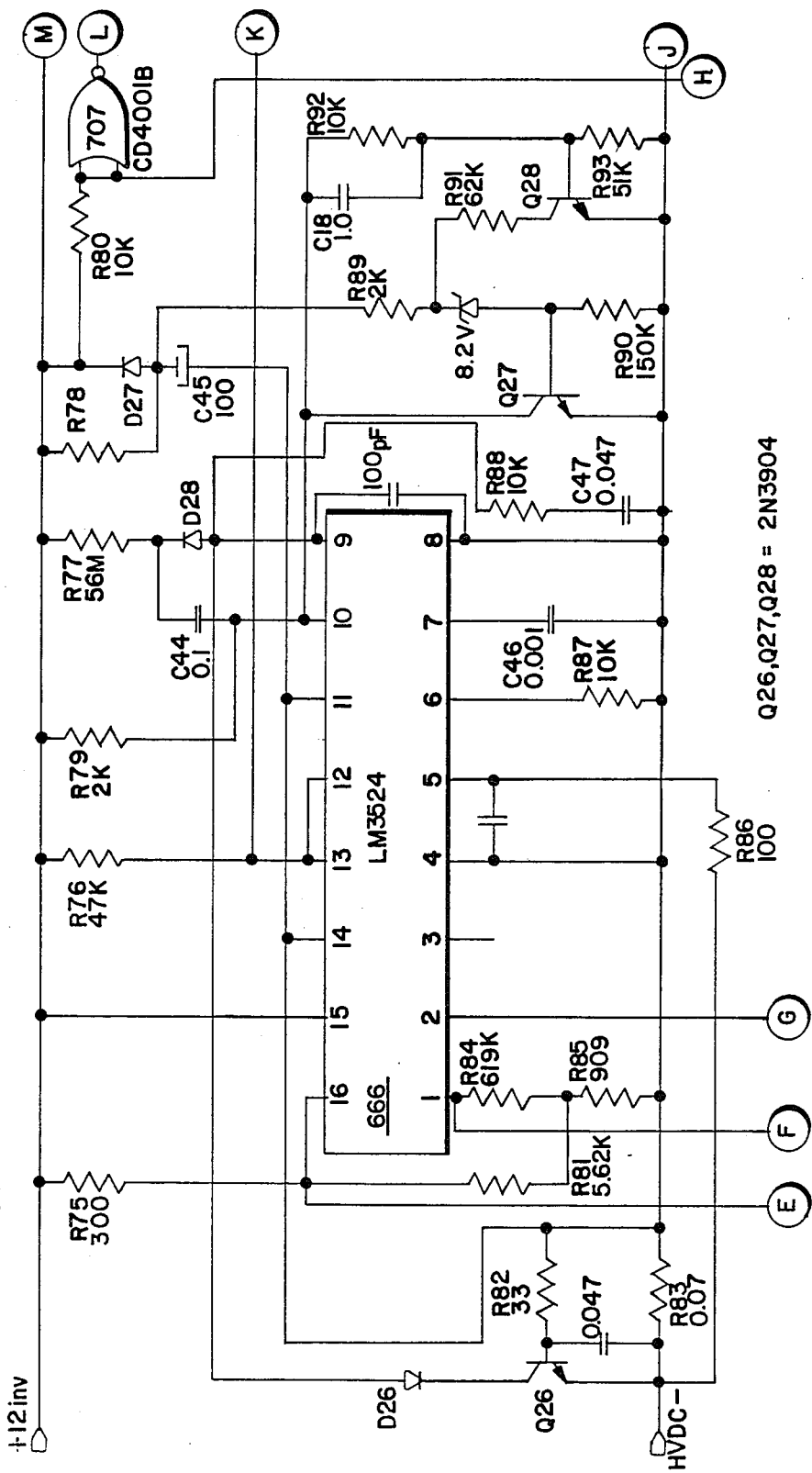
FIGS. 16A, 16B and 16C comprise the detailed electrical schematic diagrams of the control circuits for the DC/AC inverter module.
Figure 16B:
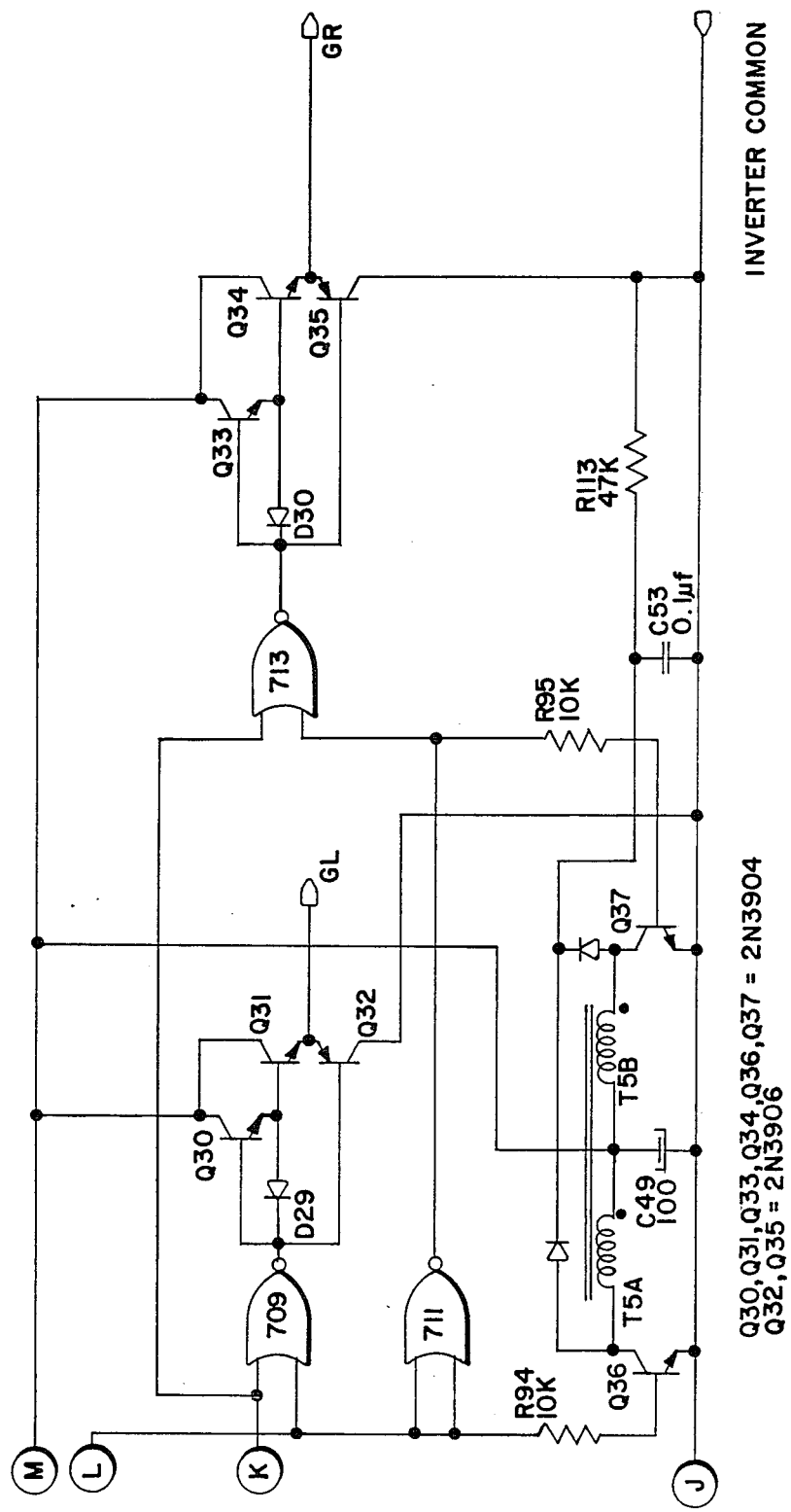

Bipolar transistors Q24 and Q25 are easily driven by the 60 Hz transformer T5 shown in FIGS. 15 and 16B as separate coils T5A and T5B wound on a common core. Transformer T5 is in the preferred embodiment a laminated core transformer which due to the laminations soaks up high-frequency noise rather than passing it through to the secondaries. This type of transformer works better than a ferrite core transformer since it better eliminates the high-frequency noise that may be generated by other parts of the circuitry.

Buck converters L9 and L8 are controlled by a control circuit described below which synchronizes the alternate switching of transistors Q24 and MF8 and transistors Q25 and MF7. The details of this circuitry are best understood by viewing the detailed schematic diagrams shown in FIGS. 16A, 16B and 16C together.

Figure 16C:
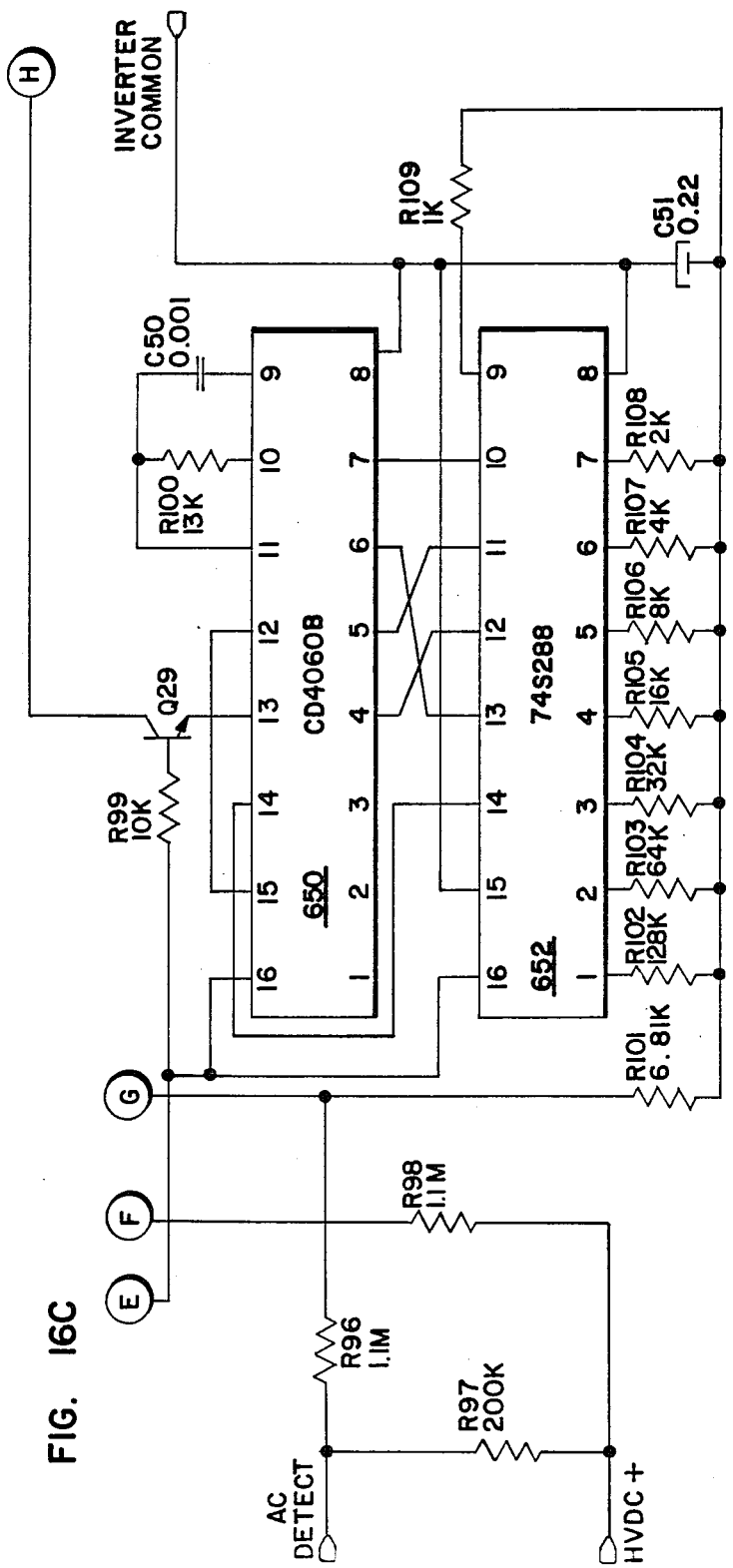

A sine wave reference oscillator (SRO) is constructed using a 14-bit binary counter and oscillator chip 650 and an 8×32 TTL ROM chip 652 to provide a digital representation of a half-sine wave every 1/120 of a second. The binary counter and oscillator chip 650 is in the preferred embodiment a CD4060B CMOS 14-bit binary counter and oscillator aviailable from RCA Semiconductor and other vendors. This chip contains integral clocking support circuitry such that the clocking signal can be derived by merely using an RC network to control the period of oscillation. Resistor R100 and capacitor C50 are used in the preferred embodiment to generate a 61.44 KHz clocking frequency. Those skilled in the art will recognize that the values shown in FIG. 16C are selected to derive the appropriate clocking frequency even though the exact RC combination of the values shown does not exactly equal 61.44 KHz. This is due to the fact that the internal oscillator circuitry generates an asymmetric clocking signal such that slightly different values must be used to obtain an exact multiple of the 60 Hz clocking frequency required to drive the SRO.

Only the first 10 bits of the 14-bit binary counter in chip 650 are used in the preferred embodiment. The Q10 output from pin 15 is used to drive the reset input on pin 12 of the counter 650. Thus, the counter is allowed to divide the clocking frequency by 1024 before resetting the counter to beginning counting from zero once again. By dividing the 61.44 KHZ signal by 1024, a 60-cycle repeating sequence is derived on the data outputs of the 14-bit binary counter 650.

The data outputs Q4 through Q8 are used to drive the address inputs of 8×32 ROM chip 652 which in the preferred embodiment is an LM74S288 Schottky TTL ROM which has been programmed to contain a digital representation of a half sign pulse. The data stored in ROM 652 is shown in Table 1 below.

TABLE 1

| MEM LOCATION | DATA 76543210 |
| --- | --- |
| (0) 00000... | 00110010 |
| (1) 00001... | 00111001 |
| (2) 00010... | 00111111 |
| (3) 00011... | 01000110 |
| (4) 00100... | 01001100 |
| (5) 00101... | 01010010 |
| (6) 00110... | 01011000 |
| (7) 00111... | 01011101 |
| (8) 01000... | 01100001 |
| (9) 01001... | 01100101 |
| (10) 01010... | 01101001 |
| (11) 01011... | 01101100 |
| (12) 01100... | 01101110 |
| (13) 01101... | 01110000 |
| (14) 01110... | 01110001 |
| (15) 01111... | 01110001 |
| (16) 10000... | 01110001 |
| (17) 10001... | 01110000 |
| (18) 10010... | 01101110 |
| (19) 10011... | 01101100 |
| (20) 10100... | 01101001 |
| (21) 10101... | 01100101 |
| (22) 10110... | 01100001 |
| (23) 10111... | 01011101 |
| (24) 11000... | 01011000 |
| (25) 11001... | 01010010 |
| (26) 11010... | 01001100 |
| (27) 11011... | 01000110 |
| (28) 11100... | 00111111 |
| (29) 11101... | 00111001 |
| (30) 11110... | 00110010 |
| (31) 11111... | 00101011 |

The digital representation of the half-sine pulse stored in ROM 652 is represented by an 8-bit digital data word and divided into 32 discrete values representing 32 points along the half-sine pulse. Thus, the digital data in Table 1 shows the near-zero crossing data in locations 0 and 31 with the near-peak data stored in locations 14–16.

The 32 locations of ROM 652 are stepped sequentially for each half-cycle of the 60-cycle AC output of the DC-to-AC inverter. The Q4 output of counter 650 is used as the least significant address bit into ROM 652, and thus changes at a 3.84 KHZ clock frequency. This is equivalent to a 260.4 ms period, which is equivalent to 1/32 of a step of a 1/120-second half-sine pulse. Thus, the entire 32 address locations are clocked in 1/120 of a second, representing a half-sine pulse.

The 8-bit digital data output of ROM 652 is driven into a D/A converter constructed of discrete resistors R102 through R109. The most significant bit (the seven bit of the data word shown in Table 1) out of pin 9 of ROM 652 drives resistor R109 while the least significant bit (the zero bit of the data word shown in Table 1) out of pin 1 of ROM 652 drives resistor R102. The summed voltage on the resistors R102 through R109 is smoothed by capacitor C51 and output through resistor R101.

Counter 650 operates from a free-running RC timing network which is accurate to within ±10% of 60 Hz. The output of the D-to-A converter attached to ROM 652 is a full-wave rectified 60 Hz AC signal. The digital data stored in ROM 652 and shown in Table 1 does not use the complete capability of range of all data bits, since in the preferred embodiment of the present invention it was deemed unnecessary. For example, the digital data does not reach a zero digital value for the sine wave (normally represented by 00000000 binary) and does not peak at a value of 256 (represented by 11111111 binary). Values are used within this range so that the error amplifier within the pulse width modulator discussed below is not required to operate from rail to rail, as is well known to those skilled in the art. Better accuracy is obtained by keeping the output of the SRO within an acceptable linear range.

The fully rectified 60 Hz AC output from the D/A converter of the SRO is driven into pin 2 of the pulse width modulator chip 666. This chip, used as a PWM chip, is in the preferred embodiment a regulating pulse width modulator chip available from National Semiconductor and other vendors. Pin 2 of the LM3524 chip 666 is the noninverting input to an error amplifier which is used to control the pulse width modulator. Also driving the error amplifier input on pin 2 of chip 666 is the HVDC+ voltage value on the high voltage bus and the AC detect sense line taken from the AC output as shown in FIG. 15, summed through a resistive summing network as shown in FIG. 16C as comprised of resistors R96, R97 and R98. Resistor R98 is also driven into pin 1 of chip 666, which is the inverting input to the aforementioned error amplifier controlling the pulse width modulator. This resistive summing network between the output of the SRO, the HVDC+ and the AC detect results in causing the PWM chip 666 to regulate the AC output to produce a closely tracked 120VAC 60 HZ±10% output on the AC output regardless of the load on the AC output or the voltage on the HVDC bus.

Current to the AC output is sensed through resistor R83 placed between INVERTER COMMON and −HVDC. An excessive current draw through resistor R83 will produce a voltage sufficient to turn on transistor Q26 which grounds pin 9 of the PWM chip 666 which shuts down the PWM.

The polarity of the AC output is controlled by the Q9 output, which can be viewed as the most significant bit out of counter 650 above the Q4-Q8 outputs used to address ROM 652. When the ROM is scanned once through the 32 locations by Q4-Q8, Q9 nine changes state, indicating to the inverter circuitry that the polarity on the output must change state to generate a negative half-sine pulse.

The +12INV supply is used for driving the inverter control circuitry shown in FIGS. 16A-16C. However, it will be recognized by those skilled in the art that TTL ROM chip 652 must be driven from a +5VDC supply and the address inputs from the CMOS counter chip 650 must also be TTL-level compatible. This requires a 5V supply, which is generated as a reference voltage by the PWM chip 666 on pin 16. This 5V internal reference supply sources enough current on pin 16 to drive chips 650, 652 and several of the associated discrete components such as transistor Q29. Transistor Q29 then acts as a level shifter between the TTL levels of counter chip 650 and the CMOS level inputs to NOR gate 707.

The synchronization pulse taken from the collector of transistor Q29 is inverted by NOR gate 707 and used to synchronize NOR gates 709, 711 and 713 to control the gating of the transistor switches of the H-bridge circuit of FIG. 15. This polarity signal selects which of the pairs of switches will be turned on to generate the positive half-sine pulse and which switches will be turned on to generate the negative half-sine pulse. Control lines GL and GR operate to provide a fast switching pulse width modulated signal to MOSFET transistors MF7 and MF8 respectively to control the buck regulators L7 and L8 respectively. The switching frequency of the MOSFET transistors is in the preferred embodiment approximately 100 KHz. The enabling of signals GL and GR are controlled by NOR gates 709 and 713 respectively.

The bipolar transistors switches Q24 and Q25 of FIG. 15 are controlled through transformers T5A and T5B by transistors Q36 and Q37. The base of transistor Q36 is switched by the polarity control signal out of NOR gate 707, while the base of transistor Q37 is switched by the inverted version of this signal inverted by NOR gate 711. Transistors Q36 and Q37 are switched at the polarity signal or 60 Hz, which causes the bipolar upper transistors Q24 and Q25 to likewise be switched at the polarity rate of 60 Hz.

The pulse width modulator chip 666 controlling the high-speed switching transistors connected to control lines GL and GR is constructed and operates in a conventional fashion as described in the 1982 *Linear Data Book* produced by National Semiconductor Corporation of Santa Clara, Calif., pages 1-148 through 1-162.

The circuitry described above for the DC-to-AC inverter results in a smooth AC output which is well regulated under varying supply and load conditions. The SRO used is relatively immune to noise generated by the other circuits of the IUPS, and remains stable and consistent.

The resulting DC-to-AC inverter is a nonisolated inverter which requires no power transformers to generate an AC voltage output. The only energy storage units are inductor L8 and L9, which can be constructed in the preferred embodiment as very small 200-microhenry 2-amp inductors since the operating frequency is approximately 100 KHz. This design results in a highly efficient and compact DC-to-AC inverter. In a unique manner, inductors L8 and L9 could be combined on two cores in such a way as to fur reduce the core sizes required. In this approach, L8 consists of two series connected windings, each wound with N clockwise turns on a separate core. L9 consists of two series connected windings, each on the same core as one of the L8 windings, except that one L9 winding is clockwise while the other is wound counter-clockwise. In this manner, core material is utilized more efficiently since both cores are always being used. Since windings oppose, voltages across one inductor do not induce voltages across the other. The winding approach described here is similar to that of a conventional magnetic amplifier, but saturable cores are not used, and the application for this winding method is novel, and can be used in many other applications where separate inductors with mutually exclusive currents are used, such as in H-bridge resonant converters.

Battery Charger and Batteries

Figure 17:
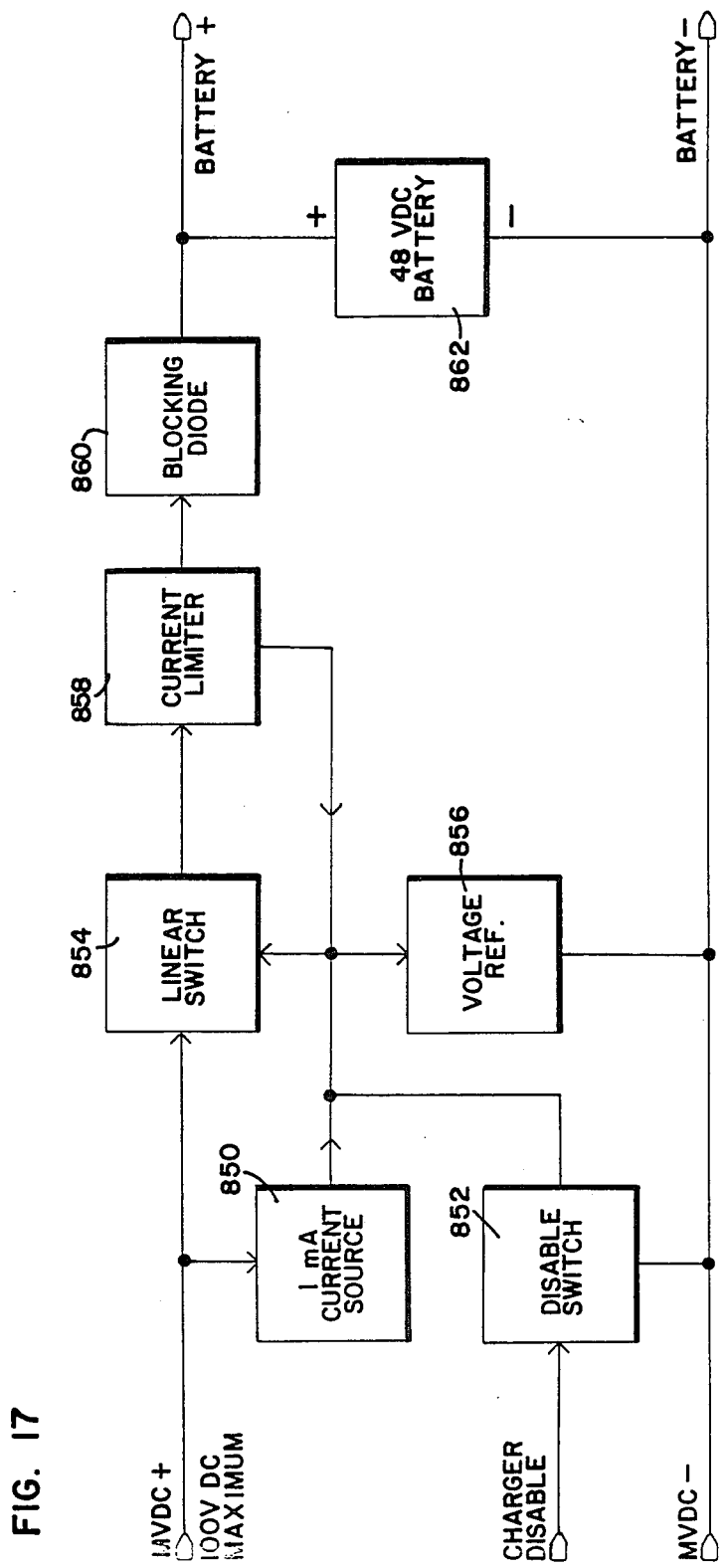
FIG. 17 is a low-level block diagram of the battery charger circuit.

FIG. 17 shows an intermediate level block diagram of the battery charger circuit with the 48VDC batteries. The MVDC output from the dual primary resonant converter circuit supplies an approximately 100VDC maximum voltage to the battery charger line. This voltage is regulated using a linear switch 854 and a current limiter 858 to charge batteries 862 through blocking diode 860 with approximately 54VDC. Blocking diode 860 prevents reverse power flow when the charging circuit is disabled. A 1-milliamp current source 850 is used to provide a constant current through the voltage reference 856 so that a constant regulating reference voltage is available for the linear switch of the regulator. Disable switch 852 receives the battery charger disable signal from the control circuit for the DC/DC dual primary resonant converter, as shown in FIG. 9. The charge or disable line is held active when the high voltage on the HVDC bus drops below the minimum required threshold and the battery backup is invoked. Thus, when the batteries are discharging to supply power to the IUPS, the charging circuit is disabled to conserve power.

Figure 18:
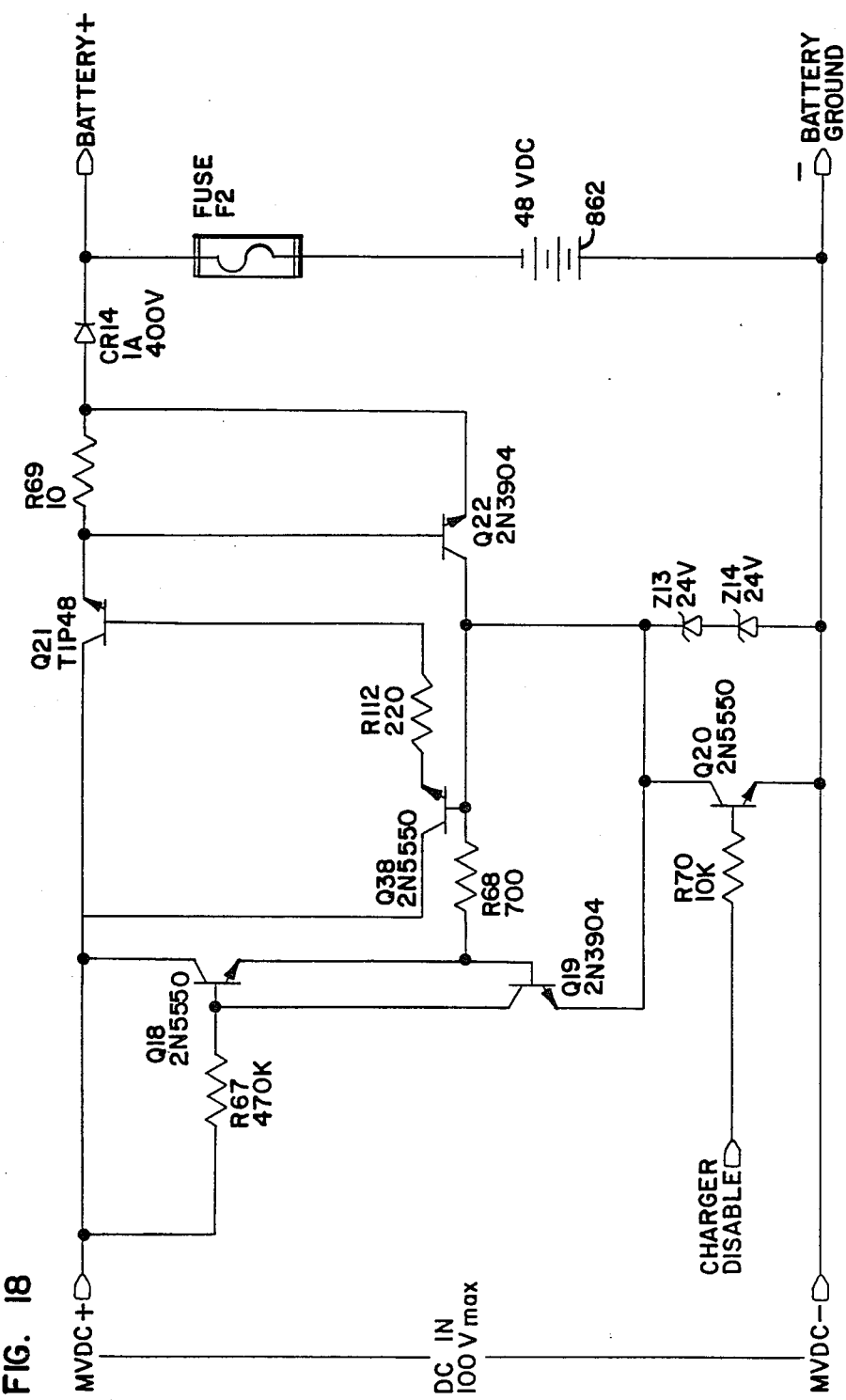
FIG. 18 is a detailed electrical schematic diagram of the battery charger circuit.

FIG. 18 shows the detailed electrical schematic diagram of the battery charger circuit and the battery. The 48VDC battery pack is in the preferred embodiment implemented using rechargeable starved electrolyte lead acid batteries, part number NP 1.2-12 available from Yuasa Corporation of Japan and other vendors of rechargeable batteries. The batteries are protected against deep discharge by the CCPS circuit described above and are capable of handling several hundred cycles of charging and discharging. The battery voltage ranges between 54V fully charged and 40VDC where shutdown of the IUPS occurs. The current draw ranges from zero to 8.5 amps maximum. The battery is fused by fuse F2 for safety.

A 1-milliamp current source is formed by transistors Q18 and Q19 to deliver a constant 1-milliamp current regardless of the DC input voltage on the MVDC bus. This 1-milliamp current is applied to the anode of zener diode Z13. This constant 1-milliamp current source ensures that the voltage on the anode of zener diode Z13 is maintained at a constant 48V. Zener diodes Z13 and Z14 are in the preferred embodiment stacked 24V zener diodes to produce a 48V drop. The selection of the zeners is a matter of design choice, since two 24V zeners were commonly available.

The charger disable line drives the base of transistor Q20 through resistor R70 which serves to ground the anode of zener diode Z13. When the 1-milliamp current from the current source is redirected through transistor Q20, the linear regulator stops allowing current from passing through transistor Q21, effectively shutting down the battery charger.

A linear regulator is constructed with transistor Q21 driven in a darlington fashion from transistor Q38 through resistor R11. Transistor Q38 serves to bias the base of transistor Q21 to a level set by the constant voltage on zener diodes Z13 and Z14.

A current limiter is constructed using resistor R69 and transistor Q22. When the current through the 10-ohm resistor R69 exceeds the preset limit, transistor Q22 conducts, effectively limiting the amount of current that is allowed to pass through transistor Q21.

Replacement of Existing PC Power Supply

Figure 19:
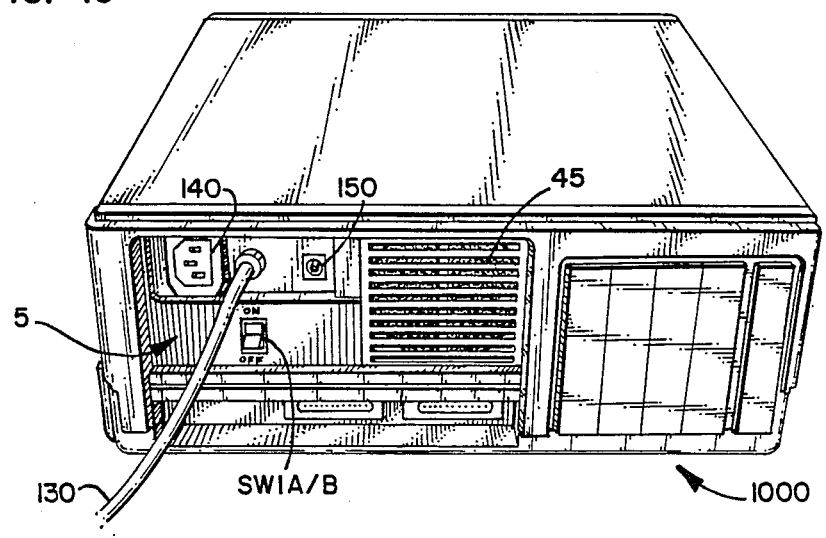
FIG. 19 is a back-view of a personal computer with the present invention installed.

The preferred embodiment of the present invention is a plug-in replacement for personal computer power supplies that fits within the existing housings. Although the present invention can easily be operated external to the computer to which it is attached, the preferred attachment of the present invention is made by placing the IUPS 5 internal to the personal computer cabinet 1000 as shown in FIG. 19. The AC input line is taken along cord 130, however, those skilled in the art will readily recognize that an AC input connector may be substituted therefor. An AC voltage output 140 is provided from the DC-to-AC inverter internal to the IUPS 5. Also, an external battery connector 150 is provided to augment the internal storage battery to prolong the battery backup capability of the IUPS 5. An AC fan 45 is incorporated in the IUPS 5 to provide cooling to the PC cabinetry and also cooling to the IUPS. Existing power supplies typically use a DC fan. AC fan 45 provides a minimum AC load for the output of DC/AC inverter 40. Main power switch SW1A/SW1B is shown on the back of FIG. 19 which forms the main power control switch.

Figure 20:
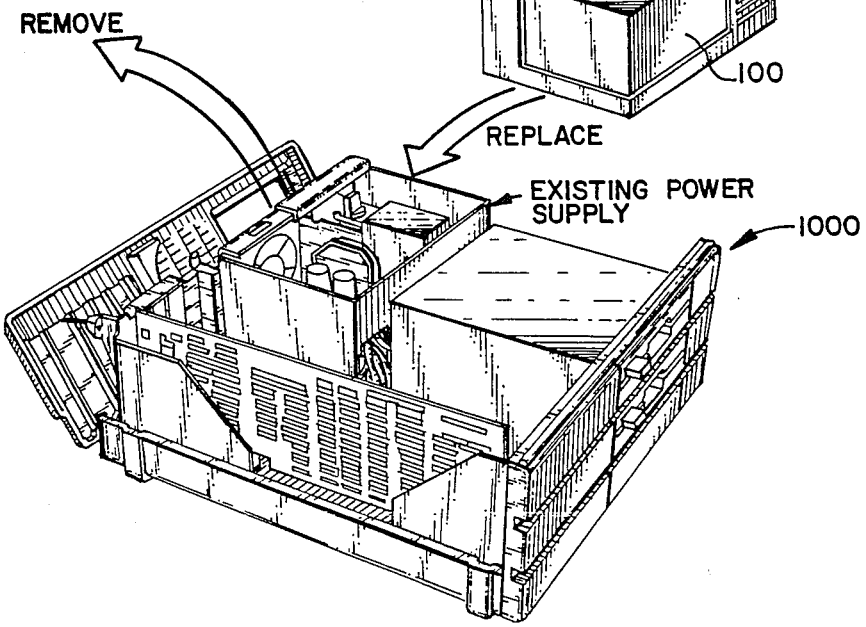
FIG. 20 is a perspective view of a desktop personal computer cabinet with the cover removed to show the replacement of the existing power supply with the present invention.

The replacement of the existing power supply within a personal computer cabinet 1000 with the IUPS 5 of the preferred embodiment of the present invention is shown in FIG. 20. The existing power supplies of personal computers are typically low-efficiency models which are plugged into the personal computer for easy removal upon failure. The plugs are merely disconnected, and with the removal of a few screws the entire power supply can be removed from the cabinet. The IUPS 5 of the preferred embodiment of the present invention is compactly contained with the battery pack 100 in a housing which is approximately equal in size and volume to the existing power supply. The IUPS 5 is inserted after the existing power supply is removed, and the plug connectors are plugged into the IUPS for powering the personal computer and the internal disk drives. The back of the IUPS, shown in FIG. 19, provides AC input and output and an external battery connector 150 for augmenting the internal battery pack 100. The overall sizing and efficiency of the preferred embodiment of the present invention allows for a simple and efficient replacement of existing power supplies to provide uninterruptible power to personal computers and their associated AC peripheral components without increasing the overall size of the existing personal computer cabinet 1000.

It will be readily apparent to those skilled in the art that many modifications to the preferred embodiment of the present invention are possible without deviating from the scope and spirit of the present invention. Special conditions employed for the implementation of the preferred embodiment are not intended to be limiting and are easily adaptable to alternate implementations. For example, the control structure of the present invention is generally implemented using discrete components or some SSI logic functions. It will be readily understood by those skilled in the art upon reading and understanding the specification and drawings that the control structure of the present invention may be implemented in a variety of different ways, including the use of microprocessor control, ROM microcode control, PLA or PAL logic structures, and other types of hardwired or software-controlled state machines. For example, in the present preferred embodiment of the DC-to-AC inverter circuit, the generation of a digital representation of a sine wave through the sine wave reference oscillator may easily be converted to a microprocessor-generated sine wave reference signal. The reliance on an 8×32 PROM is only representative of a wide variety of techniques for storing a digital representation of an analog signal.

Although specific logic configurations and electrical configurations have been illustrated and described for the embodiment of the present invention set forth herein, it will be appreciated by those of ordinary skill in the art that any conventional logic or electrical arrangements which are calculated to achieve the same purpose may be substituted for the specific configurations shown. Thus, although conventionally available discrete components and SSI or MSI logic is generally preferred due to its availability, the electrical configurations and the logic described herein may be implemented through the use of conventional components or it may all be combined to a greater or lesser degree in a fewer number of LSI or VLSI components. In addition, it will be readily appreciated by those of ordinary skill in the art that although positive and negative logic conventions have been used, negative and positive logic conventions may be alternatively substituted. Additionally, although specific logic components and associated conditions necessary for the operation of this system have been mentioned in order to describe the preferred embodiment of the present invention, complementary logic configurations similar to those mentioned may be alternatively employed, such as the substitution of NAND-type logic for that of NOR-type logic without any deviation from the concepts of the invention disclosed.

While the present invention has been described in connection with the preferred embodiment thereof, it will be understood that many modifications will be readily apparent to those of ordinary skill in the art, and this application is intended to cover any adaptations or variations thereof. Therefore, it is manifestly intended that this invention be limited only by the claims and in the equivalents thereof.

What is claimed is:

1. An integrated uninterruptible power supply for computers and associated peripherals, comprising:
    a bus capable of receiving and sourcing high DC voltages;
    input means for converting AC line voltage into a first high DC voltage and for placing said first high DC voltage onto said bus;
    inverter means connected to said bus for generating AC output voltage from said high DC voltages to supply the peripherals with said AC output voltage;
    a dual primary resonant converter including a transformer, said converter having (1) high voltage primary means connected to a first winding of said transformer and further connected to said bus for receiving said high DC voltages, (2) medium voltage primary means connected to a second winding of said transformer and further connected to a battery pack for receiving battery voltage, (3) high voltage secondary means connected to a third winding of said transformer and further connected to said bus and operable for producing a second high DC voltage and for placing said second high DC voltage onto said bus, and (4) at least one low voltage secondary means connected to a fourth winding on said transformer operable for producing at least one regulated DC voltage for the computer;
    said dual primary resonant converter further includes series resonant conversion means having inductance and capacitance in series with at least one of said windings for performing series resonant conversion; and
    control means connected to said dual primary resonant converter for enabling said high voltage primary when said input means receives sufficient AC line voltage.

2. The power supply according to claim 1 wherein said dual primary resonant converter further comprising medium voltage secondary means connected to a fifth winding of said transformer for producing DC power and battery charger means connected to said medium voltage secondary means for receiving said DC power and for charging said battery pack.

3. The power supply according to claim 1 wherein said control means is further operable for disabling both primary means of said dual primary resonant converter when said battery pack discharges to a preselected level and when said input means does not receive sufficient AC line voltage.

4. The power supply according to claim 1 further including a control circuit power supply operable for providing a start-up bias current from said battery pack for powering said control means.

5. The power supply according to claim 1 wherein said inductance consists entirely of transformer leakage inductance.

6. The power supply according to claim 1 wherein said control means further includes
    feedback means connected for sensing the voltage on at least one of said secondary means and for producing a feedback signal in proportion thereto; and
    a voltage-controlled oscillator attached to said high voltage primary means and said medium voltage primary means and operable for controlling said primaries to regulate the voltage on said secondary means in response to said feedback signal.

7. The power supply according to claim 1 being sized to contain said battery pack and to fit wihtin the existing housing of the computer as a replaceable substitute for an existing power supply.

8. The power supply according to claim 1 being sized to fit within existing housing of the computer as a replaceable substitute for an existing power supply with said battery pack consisting of an external line-isolated DC source.

9. The power supply according to claim 6 further including indicator means attached to said voltage controlled oscillator for indicating when said control means has enabled said medium voltage primary and for further indicating the state of charge of said battery pack.

10. The power supply according to claim 1 wherein said series resonant conversion employs zero current switching such that a minimum radiated electrical interference is produced and high electrical conversion efficiency is maintained.

11. The power supply according to claim 1 wherein said high voltage secondary means further includes second series resonant conversion means for performing series resonant conversion at a frequency which approximately matches the resonant frequency of at least one of said primary means such that the leakage inductance of said third winding of said high voltage secondary means does not appreciably affect the circulating currents in said windings of said primary means.

12. The power supply according to claim 1 wherein said control means determines when a sufficient AC line voltage is available on said input means for enabling said primary means based upon voltage level of said high DC voltages on said bus.

13. The power supply according to claim 1 further including a plurality of said low voltage secondary means each connected to separate windings on said transformer and each operable for producing at least one regulated DC voltage and each of said windings of said low voltage secondary means constructed using cofiler wound copper strips such that relatively close voltage tracking is achieved between said regulated DC voltages.

14. A DC-to-AC voltage inverter comprising:
    a sine wave reference oscillator operable for producing a sine wave signal from a digitally stored facsimile;
    switching means for switching a DC voltage into an AC voltage and placing said AC voltage on an output;
    control means connected for controlling said switching means in response to said signal received from said sine wave reference oscillator such that said AC voltage is regulated in response thereto; and
    said switching means includes dual buck converters arranged in an H-bridge configuration.

15. A DC-to-AC voltage inverter comprising:
    a sine wave reference oscillator operable for producing a sine wave signal from a digitally stored facsimile;
    switching means for switching a DC voltage into an AC voltage and placing said AC voltage on an output;

control means connected for controlling said switching means in response to said signal received from said sine wave reference oscillator such that said AC voltage is regulated in response thereto; and said sine wave reference oscillator is constructed using a clocking means for driving a memory means at a fixed frequency, said memory means programmed for storing said digitally stored facsimile and a digital-to-analog converter for producing said sine wave signal from said digitally stored facsimile.

16. The inverter according to claim 15 wherein said control means includes a pulse width modulator operable for varying the switching of said switching means in proportion to the summed magnitude of said AC voltage on said output and the magnitude of said signal.

17. The inverter according to claim 15 wherein said control means is further connected for controlling said switching means in response to said signal received from said sine wave reference oscillator such that said AC voltage is regulated both in magnitude and frequency in response thereto.

18. A method of providing uninterruptible power to a computer and associated peripherals, comprising the steps of:
  (a) sensing AC line voltage for sufficient magnitude;
  (b) converting said AC line voltage to a first DC high voltage;
  (c) series resonant converting said first DC high voltage into low DC voltage for use by the computer if said AC line voltage is sufficient in magnitude;
  (d) series resonant converting battery voltage into said low DC voltage for use by the computer if said AC line voltage is insufficient in magnitude;
  (e) series resonant converting said battery voltage into a second DC high voltage if said AC line voltage is insufficient in magnitude;
  (f) inverting said first DC high voltage into an uninterrupted AC voltage for use by the peripherals if said AC line voltage is sufficient in magnitude; and
  (g) inverting said second DC high voltage into an uninterrupted AC voltage for use by the peripherals if said AC line voltage is insufficient in magnitude.

19. An integrated uninterruptible power supply for computers and associated peripherals, comprising:
  input means for conditioning AC line voltage, for converting said conditioned AC line voltage into a first DC high voltage and for placing said first DC high voltage onto a bus;
  high voltage switch means connected to said bus for producing switched DC high voltage from at least one of said first Dc high voltage and a second DC high voltage;
  low voltage switch means for producing switched DC low voltage from battery voltage received from a battery pack;
  a power transformer haivng a high voltage primary winding connected to said high voltage switch means for receiving said switched DC high voltage and having a low voltage primary winding connected to said low voltage switch means for receiving said switched DC low voltage;
  said power transformer operable in response to receiving one of said switched DC high voltage and said switched DC low voltage for producing on a low voltage secondary winding at least one low voltage output for supplying the computer and for producing on a high voltage secondary winding said second DC high voltage connected for driving said bus;
  said power transformer further including resonant conversion means connected to at least one of said primary windings for performing series resonant conversion;
  inverter means connected to said bus for generating AC output voltage from at least one of said first and said second high DC voltages to supply the peripherals with said AC output voltage; and
  control means connected to said high voltage switch means, said low voltage switch means, said bus, and at least one of said secondary windings for enabling said high voltage switch means when said first DC high voltage on said bus is above a first preselected level, for enabling said low voltage switch means when said first DC high voltage on said bus is below a second preselected level, and for controlling said high voltage switch means and said low voltage switch means in response to the voltage on at least one of said secondary windings such that the voltages produced on said secondary windings are regulated.

20. The power supply according to claim 19 wherein said first and second preselected levels are preselected to be the same level.

21. The power supply according to claim 19 wherein said power transformer further includes a medium voltage secondary winding connected to a battery charger for recharging said battery pack when said control means enables said high voltage switch means.

* * * * *